US008917286B2

(12) United States Patent
Ohba et al.

(10) Patent No.: US 8,917,286 B2
(45) Date of Patent: Dec. 23, 2014

(54) IMAGE PROCESSING DEVICE, INFORMATION PROCESSING DEVICE, IMAGE PROCESSING METHOD, AND INFORMATION PROCESSING METHOD

(75) Inventors: Akio Ohba, Kanagawa (JP); Hiroyuki Segawa, Kanagawa (JP); Tetsugo Inada, Kanagawa (JP); Hirotoshi Maegawa, Tokyo (JP); Jun Hiroi, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 398 days.

(21) Appl. No.: 13/127,598

(22) PCT Filed: Sep. 8, 2009

(86) PCT No.: PCT/JP2009/004441
§ 371 (c)(1),
(2), (4) Date: Jul. 26, 2011

(87) PCT Pub. No.: WO2010/055604
PCT Pub. Date: May 20, 2010

(65) Prior Publication Data
US 2011/0273470 A1    Nov. 10, 2011

(30) Foreign Application Priority Data

Nov. 11, 2008 (JP) ................................. 2008-289312
Nov. 11, 2008 (JP) ................................. 2008-289313
Nov. 11, 2008 (JP) ................................. 2008-289314
Nov. 11, 2008 (JP) ................................. 2008-289315
Nov. 12, 2008 (JP) ................................. 2008-289667
Nov. 12, 2008 (JP) ................................. 2008-289668

(51) Int. Cl.
*G06T 17/00* (2006.01)
*G09G 5/00* (2006.01)
*G06T 3/40* (2006.01)
*G06F 3/0481* (2013.01)

(52) U.S. Cl.
CPC ................ *G06T 3/40* (2013.01); *G06F 3/0481* (2013.01); *G06F 2203/04806* (2013.01)
USPC .......................................... 345/619; 345/428

(58) Field of Classification Search
USPC ........................................................ 345/619
See application file for complete search history.

(56) References Cited

U.S. PATENT DOCUMENTS 6,005,679 A * 12/1999 Haneda .......................... 358/453
6,563,999 B1    5/2003 Suzuoki
(Continued)

FOREIGN PATENT DOCUMENTS

JP    04065756 A    3/1992
JP    2000172248 A    6/2000
(Continued)

OTHER PUBLICATIONS

Korean Office Action for corresponding Korean Patent Application No. 10-2011-7011771, dated Oct. 9, 2012.
(Continued)

*Primary Examiner* — M Good Johnson
(74) *Attorney, Agent, or Firm* — Matthew B. Dernier, Esq; Gibson & Dernier LLP

(57) ABSTRACT

When a single page of a newspaper article or a magazine is displayed using hierarchical data, a guidance area (indicated by a line in the hierarchical data) for each article is defined in a scenario definition file. A plurality of guidance areas are defined in the layer below, i.e., the layer having a resolution of a level that allows characters to be legible, so that the viewer can track the article from start to end. The displayed image is initially guided to the guidance area upon a user request for enlargement. Upon a further request for enlargement, the displayed image is guided to the guidance area at the head of the article. When the user having read the sentence in the guidance area provides an input by indicating a direction or pressing a predetermined button, the displayed image is guided to the guidance area showing the continuation of the sentence.

40 Claims, 19 Drawing Sheets

(56) References Cited

U.S. PATENT DOCUMENTS

| | | | |
|---|---|---|---|
| 6,650,343 B1 | 11/2003 | Fujita | |
| 7,529,420 B2 * | 5/2009 | Ii | 382/240 |
| 2002/0025084 A1 | 2/2002 | Lee | |
| 2003/0179231 A1 | 9/2003 | Kamiwada | |
| 2004/0165789 A1 * | 8/2004 | Ii | 382/299 |
| 2005/0179685 A1 * | 8/2005 | Kake et al. | 345/419 |

FOREIGN PATENT DOCUMENTS

| | | | |
|---|---|---|---|
| JP | 2003281187 A | 10/2003 | |
| JP | 2005109798 A | 4/2005 | |
| JP | 2007241804 A | 9/2007 | |
| JP | 2008257555 A | 10/2008 | |
| KR | 20020007945 A | 1/2002 | |
| WO | 2004081869 A2 | 9/2004 | |

OTHER PUBLICATIONS

Chinese Office Action for corresponding Chinese Patent Application No. 200980144411.5, dated Dec. 5, 2012.
Korean Office Action for corresponding Korean Patent Application No. 10-2011-7011771, dated Apr. 29, 2013.
International Search Report for corresponding PCT Application PCT/JP2009/004441, dated Dec. 8, 2009.
International Preliminary Report on Patentability and Written Opinion for corresponding PCT Application PCT/JP2009/004441, dated Jun. 21, 2011.
Office Action for corresponding Korean Patent Application No. 10-2013-7020473, dated Aug. 27, 2013.
Office Action for corresponding Japanese Patent Application No. 2008-289312, dated Jun. 25, 2013.
Office Action for corresponding Japanese Patent Application No. 2008-289314, dated Jun. 25, 2013.
Office Action for corresponding Japanese Patent Application No. 2008-289313, dated Jun. 25, 2013.
Office Action for corresponding Japanese Patent Application No. 2008-289667, dated Jun. 25, 2013.
Office Action for corresponding Japanese Patent Application No. 2008-289668, dated Jun. 25, 2013.
Office Action for corresponding Japanese Patent Application No. 2008-289315, dated Jun. 25, 2013.
Office Action for corresponding Korean Patent Application No. 10-2011-7011771, dated Jul. 4, 2013.
European Search Report for corresponding EU Patent Application No. 09825859.3, dated Nov. 21, 2013.

* cited by examiner 302  304  306          308

0.0, 0.0, 2.0, 0.0, 98.0, parent_0, -0.100917, 0.202552, 0.08, 0.0
0.16, -0.11, 0.01, 0.0, -1.0, child_0, 0.0, 0.0, 1.0, 0.0
0.10, -0.14, 0.01, 0.0, -1.0, child_1, 0.0, 0.0, 1.0, 0.0
0.07, -0.15, 0.01, 0.0, -1.0, child_2, 0.0, 0.0, 1.0, 0.0
...

118

350

IMAGE PROCESSING DEVICE, INFORMATION PROCESSING DEVICE, IMAGE PROCESSING METHOD, AND INFORMATION PROCESSING METHOD

TECHNICAL FIELD

The present invention relates to an image processing technology for enlarging/reducing an image displayed on a display, or moving the image upward, downward, leftward, or rightward.

BACKGROUND ART

Home entertainment systems are proposed capable of playing back moving images as well as running game programs. In home entertainment systems, a GPU generates three-dimensional images using polygons (see, for example, patent document No. 1).

Meanwhile, a technology is proposed capable of enlarging/reducing a displayed image or moving the image upward, downward, leftward, or rightward, using tile images of a plurality of resolutions generated from a digital image such as a high-definition photo. In this image processing technology, the size of an original image is reduced in a plurality of stages to generate images of different resolutions so as to represent the original image in a hierarchical structure where the image in each layer is divided into one or a plurality of tile images. Normally, the image with the lowest resolution comprises one tile image. The original image with the highest resolution comprises the largest number of tile images. An image processing device is configured to enlarge or reduce a displayed image efficiently such that an enlarged view or reduced view is presented efficiently by switching a currently used tile image to a tile image of a different layer.

Details of certain know systems and devices may be found in U.S. Pat. No. 6,563,999

Meanwhile, mobile terminals recently available are provided with a display screen of an increasing larger size. It has therefore become possible to display high-definition images regardless of the type of information processing device. Thus, people can easily access various types of content appealing to the eye. As the information that should be displayed becomes complex and advanced, various knowledge is required in order to take advantage of the information. Therefore, the quality of information and ease of operation are often in a tradeoff relation. Creation of a complex content including images requires additional expertise.

SUMMARY OF THE INVENTION

The present invention addresses the aforementioned issue and a purpose thereof is to provide a technology capable of displaying desired information easily while maintaining the quality of information.

One aspect of the present invention relates to an image processing device. The image processing device is adapted to display at least part of an image on a display, and comprises: a storage device configured to store hierarchical data comprising image data that are representations of an image in different resolutions and that are hierarchized in order of resolution; a memory configured to store a scenario definition file designating an area in the hierarchical data in a virtual space defined by an image plane and an axis of resolution; an input information acquisition unit configured to acknowledge a user request related to a change in a displayed image; and a displayed image processing unit configured to guide the displayed image to the area designated in the scenario definition file when a predetermined request is provided by the user.

Another aspect of the present invention relates to an image processing method. The image processing method is adapted to display at least part of an image on a display, and comprises: reading image data from a storage device and rendering an image on a display device; acknowledging a user request to move a displayed image, which could be a request to move, enlarge, or reduce a display area in an image currently being displayed; guiding the displayed image to an area and resolution predefined in a memory in accordance with a request to move the displayed image.

Yet another aspect of the present invention relates to an image processing device. The image processing device is adapted to display at least part of an image on a display, and comprises: a storage device configured to store hierarchical data comprising image data that are representations of an image in different resolutions and that are hierarchized in order of resolution; a memory configured to store a link definition file mapping predetermined areas in different sets of hierarchical data to each other in a virtual space defined by an image plane and an axis of resolution; an input information acquisition unit configured to acknowledge a user request for movement of a displayed image displayed on a display in the virtual space, and a displayed image processing unit configured to switch, when the displayed image enters into a predetermined range from an area that is defined in the hierarchical data currently being displayed and that is defined in the link definition file as a result of the user request for movement of the displayed image, the displayed image to an area in another set of hierarchical data mapped to said area in the hierarchical data currently being displayed.

Yet another aspect of the present invention relates to an image processing method. The image processing method is adapted to display at least part of an image on a display, and comprises: reading image data from a storage device and rendering an image on a display device; acknowledging a user request to move a displayed image, which could be a request to move, enlarge, or reduce a display area in an image currently being displayed; and switching, when the displayed image reaches an area and resolution predefined in the memory, the display to a predetermined area in another image predefined as being mapped to the predefined area in the currently displayed image.

Yet another aspect of the present invention relates to a data structure for content. The data structure for content maps the following to each other: a link definition file mapping predetermined areas in a plurality of sets of hierarchical data comprising image data that are representations of an image in different resolutions and that are hierarchized in order of resolution to each other in a virtual space defined by an image plane and an axis of resolution, and being used for switching a display image between sets of hierarchical data; the plurality of sets of hierarchical data mapped in the link definition file; and attribute information for controlling the use of the hierarchical data.

Yet another aspect of the present invention relates to an image processing device. The image processing device is adapted to display at least part of an image on a display, and comprises: a storage device configured to store hierarchical data comprising image data that are representations of an image in different resolutions and that are hierarchized in order of resolution; a memory configured to store a link definition file mapping at least two sets of hierarchical data to each other and define a condition of switching the displayed image between the hierarchical data; a link determination unit configured to determine, while an image from a given set of hierarchical data is being displayed, whether the displayed image meets the condition for switching, by referring to the link definition file; and a displayed image processing unit configured to switch the displayed image to an image from another set of hierarchical data mapped to the hierarchical data currently being displayed, when the link determination unit determines that the condition for switching is met.

Yet another aspect of the present invention relates to an image processing method. The image processing method is adapted to display at least part of an image on a display, and comprises: reading a plurality of sets of image data mapped to each other in a memory, as a processing target; displaying at least one of the plurality of sets of image data; acknowledging a user request to move a displayed image, which could be a request to move, enlarge, or reduce a display area in an image currently being displayed; and switching, when the displayed image meets a condition predefined in a memory, the display to another set of image data mapped to the image data currently being displayed.

Yet another aspect of the present invention relates to an information processing device. The information processing device comprises: an input information acquisition unit configured to acknowledge a user input for selecting a plurality of individual images; and a definition information registration unit configured to generate data for an index image comprising an arrangement of a plurality of selected individual images in a predetermined format; wherein each of the plurality of individual images presents a hierarchical data structure comprising image data with different resolutions hierarchized in order of resolution, the definition information registration unit maps an area in the index image in which an individual image is arranged to the hierarchical data for the individual image arranged in the area, generates a link definition file for switching from the index image to the individual image for use in rendering the displayed image, and outputs the generated link definition file to a memory.

Yet another aspect of the present invention relates to an information processing method. The information processing method comprises: acknowledging a user input for selecting a plurality of individual images; generating data for an index image comprising a plurality of selected individual images read from a storage device and arranged in a predetermined format, and outputting the generated data to a memory; wherein each of the plurality of individual images presents a hierarchical data structure comprising image data with different resolutions hierarchized in order of resolution, the step of outputting maps an area in the index image in which an individual image is arranged to the hierarchical data for the individual image arranged in the area, generates a link definition file for switching from the index image to the individual image for use in rendering the displayed image, and outputs the generated link definition file.

Yet another aspect of the present invention relates to a data structure for content. The data structure for content is adapted to map the following to each other: data for a plurality of individual images each of which has a hierarchical data structure configured by hierarchizing image data with different resolutions in order of resolution; data for an index image comprising the individual images arranged in a predetermined format; and a link definition file configured to map an area in the index image in which an individual image is arranged to the hierarchical data for the individual image arranged in the area, and to switch from the index image to the individual image for use in rendering the displayed image.

Yet another embodiment of the present invention relates to an information processing device. The information processing device is adapted to an image processing device configured to read and display hierarchical data comprising image data that are representations of an image in different resolutions and that are hierarchized in order of resolution, and is adapted to generate a link definition file referred to in order to switch the displayed image between predetermined areas in different sets of hierarchical data, the information processing device comprising: a storage device configured to store the hierarchical data; a target image displaying unit configured to read and display the hierarchical data from the storage device in accordance with a user input for selection; and a definition information registration unit configured to acknowledge a user input for selecting areas in images of a plurality of sets of hierarchical data displayed by the target image displaying unit, and generate the link definition file by identifying coordinates of the selected areas in a virtual space defined by an image plane and an axis of resolution, and mapping the areas to each other.

The definition information registration unit in the information processing device may further acknowledges a user input for selecting a plurality of areas defined in the plurality of sets of hierarchical data mapped to each other by the link definition file, and generates a scenario definition file referred to in order to switch the displayed image between a plurality of areas in a plurality of sets of hierarchical data, by identifying and recording coordinates of the selected plurality of areas in the virtual space.

The definition information registration unit in the information processing device may performs pattern matching between images of the areas, selected by the user, in the different sets of hierarchical data, adjusts the coordinates of the areas in the virtual space and maps the links to each other such that objects in the respective images are displayed on the same position in the screen.

The area in the hierarchical data defined in the link definition file in the information processing device may be a rectangle having a predetermined aspect ratio.

The definition information registration unit in the information processing device may acknowledge, for each pair of corresponding areas, a user input of a condition as to whether to validate the switching of the displayed image depending on whether the initial displayed image is moved in the direction of enlargement or reduction, and record the condition in the link definition file.

The information processing device may generate a file including the hierarchical data or information related to a storage area storing the hierarchical data, the link definition file, and the scenario definition file.

The target image displaying unit in the information processing device may refer to the generated link definition file and switch the displayed image in a predetermined area in the hierarchical data mapped in the link definition file.

The definition information registration unit in the information processing may transmit the generated link definition file to the image processing device connected via a network and correct the link definition file in accordance with response information transmitted from the image processing device.

Yet another embodiment of the present invention relates to an information processing device. The information processing device is adapted to an image processing device configured to read and display hierarchical data comprising image data that are representations of an image in different resolutions and that are hierarchized in order of resolution, and is adapted to generate a scenario definition file referred to in order to switch the displayed image between a plurality of areas in the hierarchical data, the information processing device comprising: a storage device configured to store the hierarchical data; a target image displaying unit configured to read and display the hierarchical data from the storage device in accordance with a user input for selection; and a definition information registration unit configured to acknowledge a user input for selecting the plurality of areas in the hierarchical data displayed by the target image displaying unit, and generate the scenario definition file by identifying and recording coordinates of the selected plurality of areas in a virtual space defined by an image plane and an axis of resolution.

The definition information registration unit of the information processing device may acknowledge from the user information related to a method of displaying an area, maps the user selected areas defined in the scenario definition file to the information related to the method of displaying the area, and records the mapped information in the scenario definition file.

The information processing device may further generate the hierarchical data or information related to a storage area storing the hierarchical data, and the scenario definition file.

The target image displaying unit in the information processing device may switch the displayed image in a plurality of recorded areas by referring to the generated scenario definition file.

The definition information registration in the information processing may transmit the generated link definition file to the image processing device connected via a network and correct the scenario definition file in accordance with response information transmitted from the image processing device.

Attribute information for controlling the use of the hierarchical data may be included in the file stored in the information processing device.

Yet another embodiment of the present invention relates to an information processing method. The information processing method is adapted for an image processing device configured to read and display hierarchical data comprising image data that are representations of an image in different resolutions and that are hierarchized in order of resolution, and is adapted to generate a link definition file referred to in order to switch the displayed image between predetermined areas in different sets of hierarchical data, the information processing method comprising: reading and displaying the hierarchical data from a storage device in accordance with a user input for selection; acknowledging a user input for selecting areas in images of a plurality of sets of hierarchical data displayed; and outputting the link definition file to a memory by identifying coordinates of the selected areas in a virtual space defined by an image plane and an axis of resolution, and mapping the areas to each other.

Yet another embodiment of the present invention relates to a computer program. The computer program is adapted for an image processing device configured to read and display hierarchical data comprising image data that are representations of an image in different resolutions and that are hierarchized in order of resolution, and is adapted to cause a computer to generate a link definition file referred to in order to switch the displayed image between predetermined areas in different sets of hierarchical data, the computer program comprising: a module configured to read and display the hierarchical data from a storage device in accordance with a user input for selection; a module configured to acknowledge a user input for selecting areas in images of a plurality of sets of hierarchical data displayed; and a module configured to output the link definition file to a memory by identifying coordinates of the selected areas in a virtual space defined by an image plane and an axis of resolution, and mapping the areas to each other.

Yet another embodiment of the present invention relates to a non-transitory recording medium having embodied thereon a computer program. The recording medium is adapted for an image processing device configured to read and display hierarchical data comprising image data that are representations of an image in different resolutions and that are hierarchized in order of resolution, and stores a computer program configured to cause a computer to generate a link definition file referred to in order to switch the displayed image between predetermined areas in different sets of hierarchical data, the computer program comprising: a module configured to read and display the hierarchical data from a storage device in accordance with a user input for selection; a module configured to acknowledge a user input for selecting areas in images of a plurality of sets of hierarchical data displayed; and a module configured to output the link definition file to a memory by identifying coordinates of the selected areas in a virtual space defined by an image plane and an axis of resolution, and mapping the areas to each other.

Yet another embodiment of the present invention relates to an image processing device. The image processing device is adapted to display at least part of an image on a display, and comprises: a storage device configured to store hierarchical data comprising image data that are representations of an image in different resolutions and that are hierarchized in order of resolution; a memory configured to store a scenario definition file defining information related to a plurality of areas in the hierarchical data in a virtual space defined by an image plane and an axis of resolution and also defining information related to a method of displaying the areas; and a displayed image processing unit configured to refer to the scenario definition file and displaying the plurality of areas in the defined method switching between the areas continuously.

The memory in the information processing device may further store a link definition file mapping predetermined areas in different sets of hierarchical data to each other in the virtual space, the scenario definition file may designate a plurality of areas from a plurality of sets of hierarchical data mapped to each other by the link definition file, and when the displayed image enters into a predetermined range from the area that is defined in the hierarchical data currently being displayed and that is defined in the link definition file, the displayed image processing unit may switch the displayed image to the area that is mapped to the area and that is defined in another set of hierarchical data.

Attribute information for controlling the use of the hierarchical data may be attached to the hierarchical data stored in the storage device in the information processing device, and the displayed image processing unit may read the attribute information of the target hierarchical data when switching the displayed image and change the mode of display based on the information and according to a predetermined rule.

Yet another embodiment of the present invention relates to an image processing method. The image processing method is adapted to display at least part of an image on a display, and comprises: reading, from a memory, a scenario definition file defining information related to a plurality of areas in the hierarchical data in a virtual space defined by an image plane and an axis of resolution and also defining information related to a method of displaying the areas, the hierarchical data comprising image data that are representations of an image in different resolutions and that are hierarchized in order of resolution; and referring to the scenario definition file and displaying the plurality of areas in the defined method switching between the areas continuously.

Yet another embodiment of the present invention relates to a computer program. The computer program is adapted to cause a computer to display at least part of an image on a display, and comprises: a module configured to read, from a memory, a scenario definition file defining information related to a plurality of areas in the hierarchical data in a virtual space defined by an image plane and an axis of resolution and also defining information related to a method of displaying the areas, the hierarchical data comprising image data that are representations of an image in different resolutions and that are hierarchized in order of resolution; and a module configured to refer to the scenario definition file and display the plurality of areas in the defined method switching between the areas continuously.

Yet another embodiment of the present invention relates to a non-transitory recording medium having embodied thereon a computer program. The recording medium stores a computer program adapted to cause a computer to display at least part of an image on a display, the computer program comprising: a module configured to read, from a memory, a scenario definition file defining information related to a plurality of areas in the hierarchical data in a virtual space defined by an image plane and an axis of resolution and also defining information related to a method of displaying the areas, the hierarchical data comprising image data that are representations of an image in different resolutions and that are hierarchized in order of resolution; and a module configured to refer to the scenario definition file and display the plurality of areas in the defined method switching between the areas continuously.

Yet another embodiment of the present invention relates to a data structure. The data structure is adapted to mapping the following to each other: hierarchical data comprising image data that are representations of an image in different resolutions and that are hierarchized in order of resolution; a scenario definition file defining information related to a plurality of areas in the hierarchical data in a virtual space defined by an image plane and an axis of resolution and also defining information related to a method of displaying the areas, and used to display the plurality of areas, switching between the areas continuously; and attribute information for controlling the use of the hierarchical data.

In the data structure, areas in a plurality of hierarchical data may be defined in the scenario definition file, and the data structure may map the plurality of hierarchical data as defined to a plurality of sets of attribute information for controlling the use of the hierarchical data.

In the data structure, content in which images displayed continuously according to the scenario definition file may be mapped to attribute information for controlling the use of the content.

Yet another embodiment of the present invention relates to a non-transitory recording medium having embodied thereon a data structure for a content. The recording medium records the above-mentioned data structure.

Optional combinations of the aforementioned constituting elements, and implementations of the invention in the form of methods, apparatuses, systems, recording mediums and computer programs may also be practiced as additional modes of the present invention.

According to the invention, information can be displayed using an easy operation even if the information is highly advanced.

DETAILED DESCRIPTION OF THE INVENTION

Figure 1:
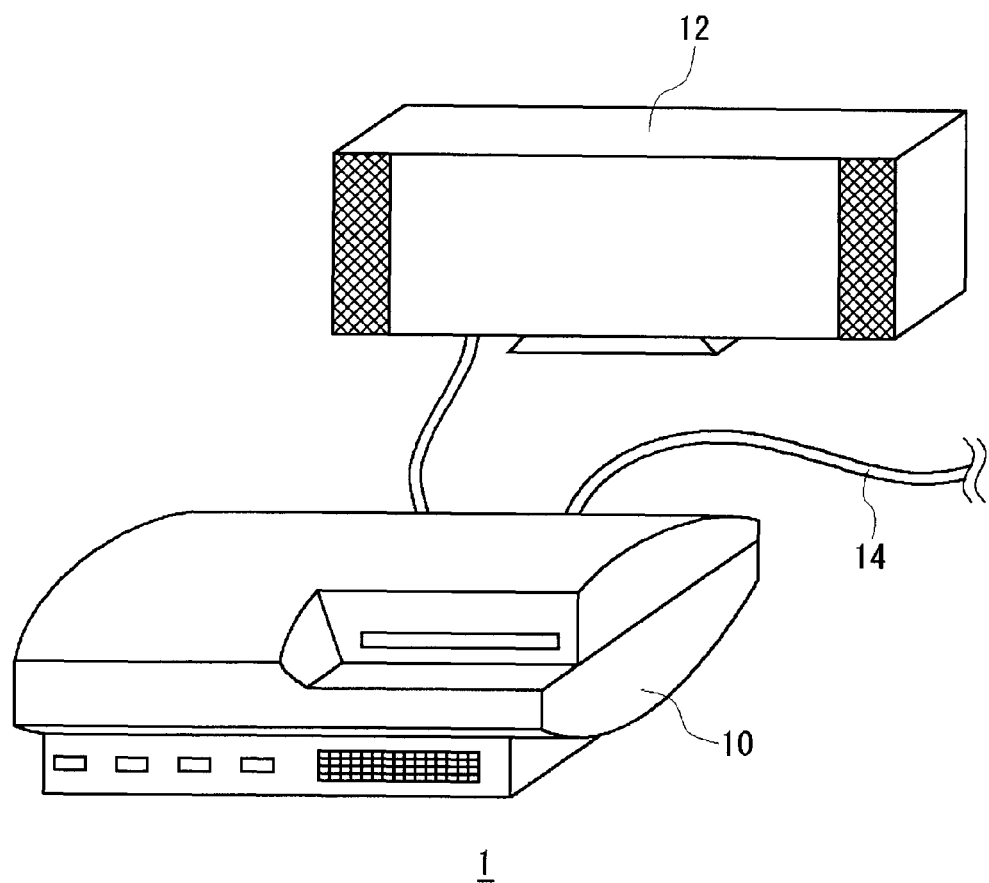
FIG. 1 shows an environment in which an image processing system according to an embodiment of the present invention is used.

FIG. 1 shows an environment in which an image processing system 1 according to an embodiment of the present invention is used. The image processing system 1 comprises an image processing device 10 configured to run image processing software and a display device 12 configured to output a result of processing by the image processing device 10. The display device 12 may be a television set provided with a display for outputting an image and a speaker for outputting sound. The display device 12 may be connected to the image processing device 10 by cable or connected wirelessly using, for example, wireless LAN (Local Area Network). The image processing device 10 in the image processing system 1 may be connected to an external network such as the Internet by a cable 14 and download and acquire hierarchized compressed image data. The image processing device 10 may be connected to an external network wirelessly.

The image processing device 10 may be a game device so that image processing functionality is achieved by loading an application for image processing. The image processing device 10 may be a personal computer so that image processing functionality is achieved by loading an application for image processing.

The image processing device 10 enlarges/reduces an image displayed on the display of the display device 12 or moves the image upward, downward, leftward, or rightward, in accordance with a user request. These processes will be generically referred to as "process to move the displayed image" hereinafter. When the user manipulates an input device by viewing an image displayed on the display, the input device transmits a request signal to move a displayed image to the image processing device 10.

Figure 2:
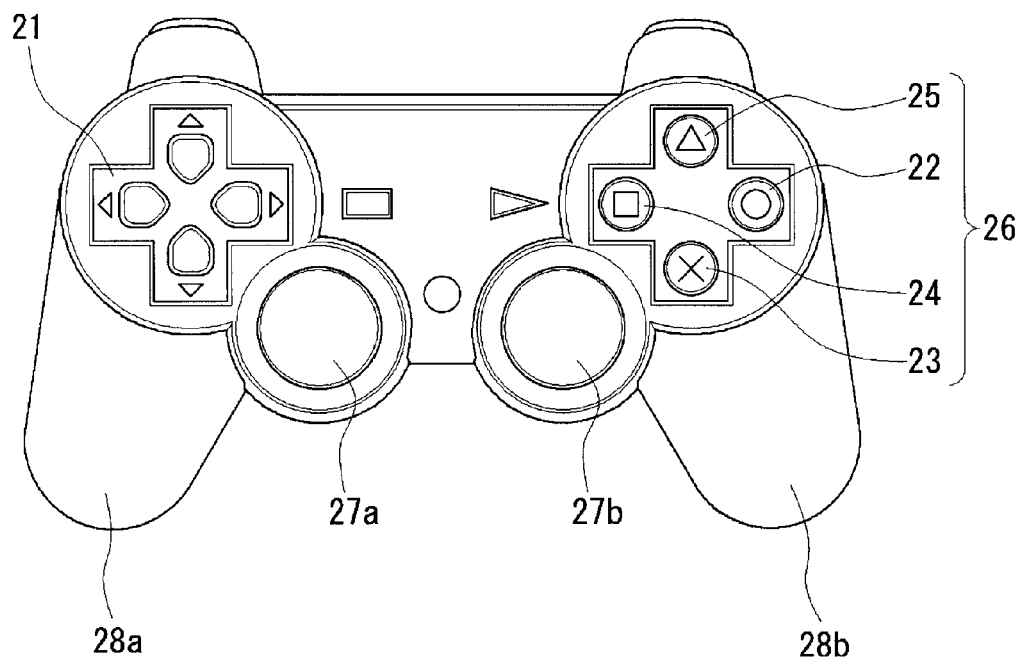
FIG. 2 shows the appearance of an input device that can be applied to the image processing system of FIG. 1.

FIG. 2 shows the appearance of the input device 20. The input device 20 is provided with directional keys 21, analog sticks 27a, 27b, and four control buttons 26, which are means for user control. The four buttons 26 comprises a circle button 22, a cross button 23, a square button 24, and a triangle button 25.

The user control means of the input device 20 in the information processing system 1 is assigned the function of entering a request for enlarging/reducing a displayed image, and entering a request for scrolling upward, downward, leftward, or rightward. For example, the function of entering a request for enlarging/reducing a displayed image may be allocated to the right analog stick 27b. The user can enter a request to reduce a displayed image by pulling the analog stick 27b toward the user and can enter a request to enlarge a displayed image by pushing it away from the user. The function of entering a request for moving a display area may be allocated to the directional keys 21. By pressing the directional keys 21, the user can enter a request for movement in the direction in which the directional keys 21 is pressed. The function of entering a request to change a displayed image may be allocated to alternative user control means. For example, the function of entering a request for scrolling may be allocated to the analog stick 27a.

The input device 20 has the function of transferring an input signal requesting to move a displayed image to the image processing device 10. In the embodiment, the input device 20 is configured to be capable of communicating with the image processing device 10 wirelessly. The input device 20 and the image processing device 10 may establish communication using the Bluetooth (registered trademark) protocol or the IEEE802.11 protocol. The input device 20 may be connected to the image processing device 10 via a cable so as to transfer a signal requesting to move a displayed image to the image processing device 10 accordingly.

Figure 3:
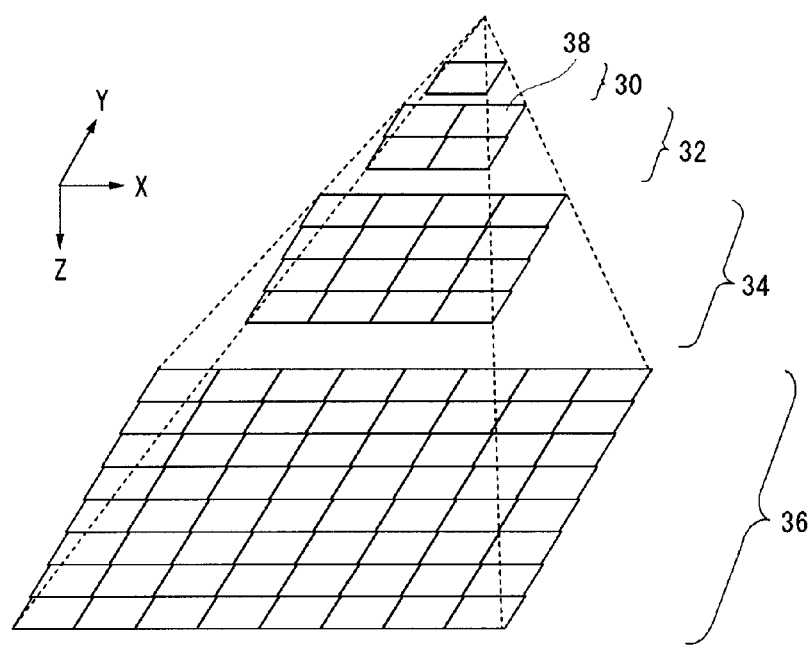
FIG. 3 shows the hierarchical structure of image data used in the embodiment.

FIG. 3 shows the hierarchical structure of image data used in the embodiment. The image data has a hierarchical structure comprising a 0-th layer 30, a first layer 32, a second layer 34, and a third layer 36 in the direction of depth (Z axis). While the figure only shows four layers, the number of layers is nonrestrictive. Hereinafter, image data having such a hierarchical structure will be referred to as "hierarchical image data".

The hierarchical image data shown in FIG. 3 has a quadtree hierarchical structure. Each layer comprises one or more tile images 38. All of the tile images 38 are formed to have the same size having the same number of pixels. For example, an image includes 256×256 pixels. The image data in the respective layers are representations of an image in different resolutions. The original image in the third layer 36 having the highest resolution is reduced in a plurality of stages to generate the image data for the second layer 34, the first layer 32, and the 0-th layer 30. For example, the resolution in the Nth layer (N is an integer equal to or greater than 0) may be ½ the resolution of the (N+1)th layer in both the horizontal (X axis) direction and the vertical (Y axis) direction.

The hierarchical image data is compressed in a predefined compression format and is stored in a storage device and is read from the storage device and decoded before being displayed on the display. The image processing device 10 according to the embodiment is provided with the decoding function compatible with a plurality of compression formats. For example, the device is capable of decoding compressed data in the S3TC format, JPEG format, JPEG2000 format. Compression may be performed for each tile image. Alternatively, a plurality of tile images included in the same layer or a plurality of layers may be compressed at a time.

As shown in FIG. 3, the hierarchical structure of hierarchical data is configured such that the horizontal direction is defined along the X axis, the vertical direction is defined along the Y axis, and the depth direction is defined along the Z axis, thereby building a virtual three-dimensional space. Upon deriving the amount of move of the displayed image by referring to the signal supplied from the input device 20 and requesting to move the image, the image processing device 10 uses the amount of move to derive the coordinates at the four corners of a frame (frame coordinates) in the virtual space. Frame coordinates in the virtual space are used to generate a displayed image. Instead of the frame coordinates in the virtual space, the image processing device 10 may derive information identifying the layer and the texture coordinates (UV coordinates) in the layer. Hereinafter, the combination of the information identifying the layer and the texture coordinates will also be referred to as frame coordinates.

Figure 4:
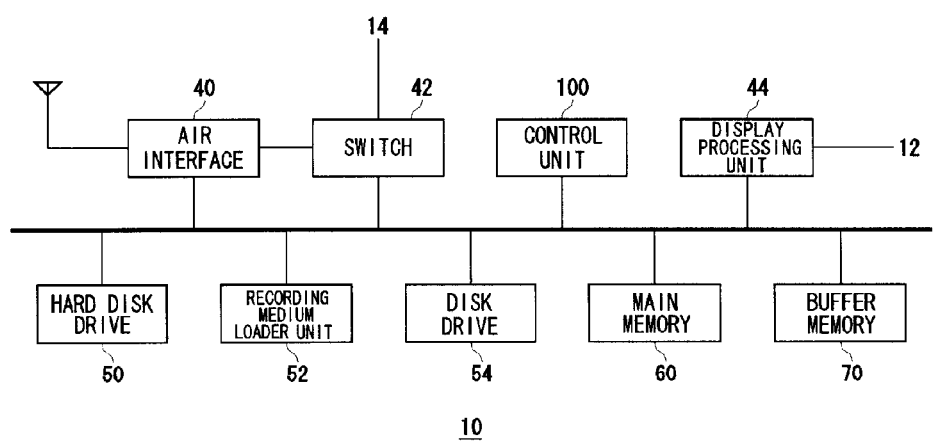
FIG. 4 shows the configuration of the image processing device according to the embodiment.

FIG. 4 shows the configuration of the image processing device 10. The image processing device 10 comprises an air interface 40, a switch 42, a display processing unit 44, a hard disk drive 50, a recording medium loader unit 52, a disk drive 54, a main memory 60, a buffer memory 70, and a control unit 100. The display processing unit 44 is provided with a frame memory for buffering data to be displayed on the display of the display device 12.

The switch 42 is an Ethernet switch (Ethernet is a registered trademark), a device connected to an external device by cable or wirelessly so as to transmit and receive data. The switch 42 may be connected to an external network via the cable 14 so as to receive hierarchized compressed image data from an image server. The switch 42 is connected to the air interface 40. The air interface 40 is connected to the input device 20 using a predefined wireless communication protocol. A signal requesting to move a display image as input by the user via the input device 20 is supplied to the control unit 100 via the air interface 40 and the switch 42.

The hard disk drive 50 functions as a storage device for storing data. The compressed image data received via the switch 42 is stored in the hard disk drive 50. When a removable recording medium such as a memory card is mounted, the recording medium loader unit 52 reads data from the removable recording medium. When a ROM disk is mounted, the disk drive 54 drives and recognizes the ROM disk so as to read data. The ROM disk may be an optical disk or a magneto-optical disk. The compressed image data may be stored in the recording medium.

The main controller 100 is provided with a multicore CPU. One general-purpose processor core and a plurality of simple processor cores are provided in a single CPU. The general-purpose processor core is referred to as a power processing unit (PPU) and the other processor cores are referred to as synergistic-processing units (SPU).

The main controller 100 is provided with a memory controller connected to the main memory 60 and the buffer memory 70. The PPU is provided with a register and a main processor as an entity of execution. The PPU efficiently allocates tasks as basic units of processing in applications to the respective SPUs. The PPU itself may execute a task. The SPU is provided with a register, a subprocessor as an entity of execution, and a local memory as a local storage area. The local memory may be used as the buffer memory 70.

The main memory 60 and the buffer memory 70 are storage devices and are formed as random access memories (RAM). The SPU is provided with a dedicated direct memory access (DMA) controller and is capable of high-speed data transfer between the main memory and the buffer memory 70. High-speed data transfer is also achieved between the frame memory in the display processing unit 44 and the buffer memory 70. The control unit 100 according to the embodiment implements high-speed image processing by operating a plurality of SPUs in parallel. The display processing unit 44 is connected to the display device 12 and outputs a result of image processing in accordance with user request.

The image processing device 10 according to the embodiment is configured to load part of the compressed image data identified by a rule described later from the hard disk drive 50 into the main memory 60 in order to change a displayed image smoothly as the displayed image is enlarged/reduced or the display area is moved. Further, the device 10 is configured to predict an image to be displayed in the future based on the user's request to move the displayed image, and decode part of the compressed image data loaded into the main memory 60 and store the decoded data in the buffer memory 70. This allows instant switching of images used for creation of displayed image when the switching is required later. Hereinafter, the process of predicting a tile image displayed in the future and storing the tile image in the buffer memory 70 will be referred to as "prefetch process".

Figure 5:
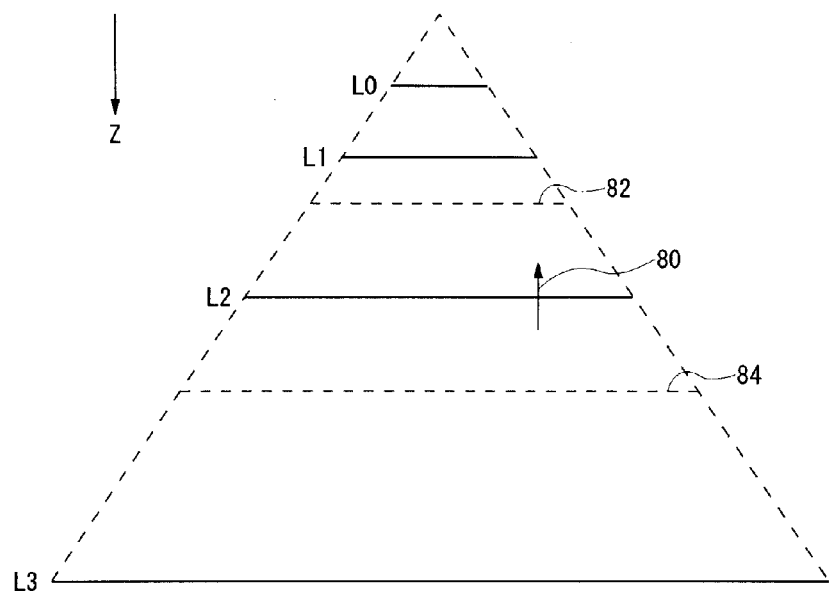
FIG. 5 shows a prefetch process according to the embodiment.

FIG. 5 shows a prefetch process. FIG. 5 shows the structure of hierarchical data. The layers are represented as L0 (0-th layer), L1 (first layer), L2 (second layer), and L3 (third layer), respectively. In the hierarchical data structure shown in FIG. 5, the position in the depth (Z axis) direction indicates the resolution. The closer to L0, the lower the resolution, and, the closer to L3, the higher the resolution. In terms of the size of the image displayed on the display, the position in the depth direction represents the scale. Assuming that the scale of the displayed image in L3 is 1, the scale in L2 is ¼, the scale in L1 is ⅟16, and the scale in L0 is ⅟64.

Therefore, if the frame changes in the depth direction away from L0 toward L3, the displayed image is enlarged. If the frame changes in the direction away from L3 toward L0, the displayed image is reduced. An arrow 80 indicates that an image movement request signal input by a user requests reduction in the displayed image and shows that reduction occurs across the scale ¼ (L2). In the image processing device 10 according to the present embodiment, the position of L1, L2, which are made available as tile images 38, in the direction of depth is defined as the boundary of prefetching in the depth direction. When an image movement request signal indicates crossing the prefetch boundary, the prefetch process is started.

When the scale of the displayed image is close to L2, the displayed image is generated by using the tile image in L2 (second layer). More specifically, the L2 image is used when the scale of the displayed image is between a switching boundary 82 and a switching boundary 84, the boundary 82 being between the image in L1 and the image in L2, and the boundary 84 being between the image in L2 and the image in L3. Therefore, when reduction of an image is requested as indicated by an arrow 80, the enlarged version of the image in L2 is turned into a reduced version and displayed. The image processing device 10 may delay generation of a displayed image requested by an image movement request signal by subjecting the image movement request signal from the input device 20 and a transfer function to convolution. Meanwhile, the image processing device 10 also identifies the tile image 38 expected to be necessary in the future based on the image movement request signal and prefetches the identified tile image 38 from the main memory. In the example of FIG. 5, when the scale requested by the image movement request signal to reduce the image exceeds L2, the image processing device 10 reads the tile image 38 in L1, which is located in the direction of reduction, from the main memory 60, decodes the read image, and writes the decoded image in the buffer memory 70.

Described above is a prefetch process in the depth direction. Prefetching in the upward, downward, leftward, or rightward direction in the identical layer is also processed in a similar manner. More specifically, the prefetch boundary is set in the image data stored in the buffer memory 70 so that, when the display position determined by the image movement request signal exceeds the prefetch boundary, the prefetch process is started.

Figure 6:
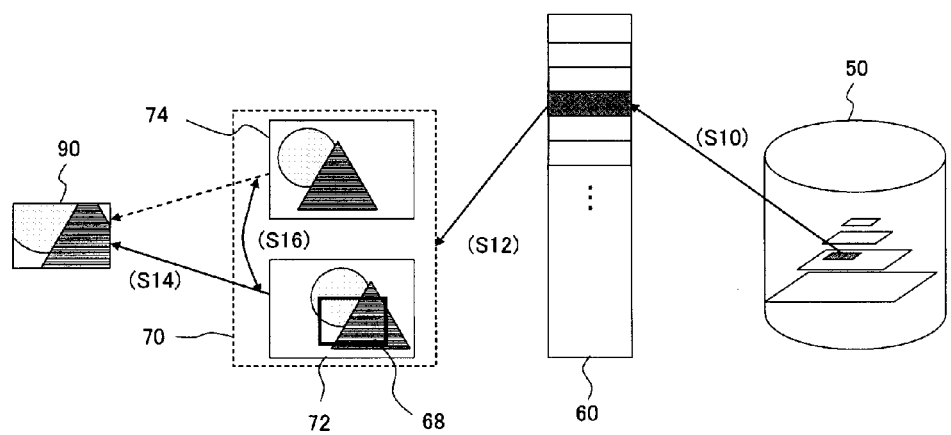
FIG. 6 schematically shows the flow of image data according to the embodiment.

FIG. 6 schematically shows the flow of image data according to the embodiment. Hierarchical data is stored in the hard disk drive 50. A recording medium mounted on the recording medium loader unit 52 or the disk drive 54 may store the data instead of the hard disk drive 50. Alternatively, the image processing device 10 may download hierarchical data from an image server connected to the device 10 via the network. As described above, the hierarchical data is compressed in a fixed-length format such as S3TC or in a variable-length format such as JPEG.

Of the hierarchical data, part of the image data is loaded into the main memory 60, maintaining a compressed state (S10). An area to be loaded is determined according to a predefined rule. For example, an area close to the currently displayed image in the virtual space, or an area predicted to be frequently requested for display, from a viewpoint of the content of image or the history of browsing by the user, is loaded. The data is loaded not only when a request to change an image is originated but also at predefined time intervals. This prevents heavy traffic for loading processes from occurring in a brief period of time.

Compressed image data is loaded in units of blocks having a substantially regular size. For this reason, the hierarchical data stored in the hard disk drive 50 is divided into blocks according to a predefined rule. In this way, data management in the main memory 60 can be performed efficiently. Even if the compressed image data is compressed in a variable-length format, the data as loaded would have an approximately equal size if the image is loaded in units of blocks (hereinafter, referred to as "image blocks"). Therefore, a new loading operation is completed basically by overwriting one of the blocks already stored in the main memory 60. In this way, fragmentation is unlikely to occur, the memory is used efficiently, and address management is easy.

Of the compressed image data stored in the main memory 60, data for an image of an area required for display, or data for an image of an area predicted to be necessary is decoded and stored in the buffer memory 70 (S12). The buffer memory 70 includes at least two buffer areas 72 and 74. The size of the buffer areas 72 and 74 is configured to be larger than the size of the frame memory 90 so that, when the signal entered via the input device 20 requests change of a certain degree or less, the image data loaded in the buffer areas 72 and 74 is sufficient to create a displayed image.

One of the buffer areas 72 and 74 is a display buffer used to store an image for creation of displayed image and the other is a decoding buffer used to make available an image predicted to become necessary subsequently. In the example of FIG. 6, the buffer area 72 is a display buffer, the buffer area 74 is a decoding buffer, and a display area 68 is being displayed. The image stored in the decoding buffer in a prefetch process may be of the same layer as the image stored in the display buffer or of a different layer with a different scale.

Of the images stored in the buffer area 72, i.e., the display buffer, the image of the display area 68 is rendered in the frame memory 90 (S14). Meanwhile, the image of a new area is decoded as necessary and stored in the buffer area 74. The display buffer and the decoding buffer are switched depending on the timing of completion of storage or the amount of move of the display area 68 (S16). This allows smooth switching between displayed images in the event of the movement of a display area or change in the scale.

Figure 7:
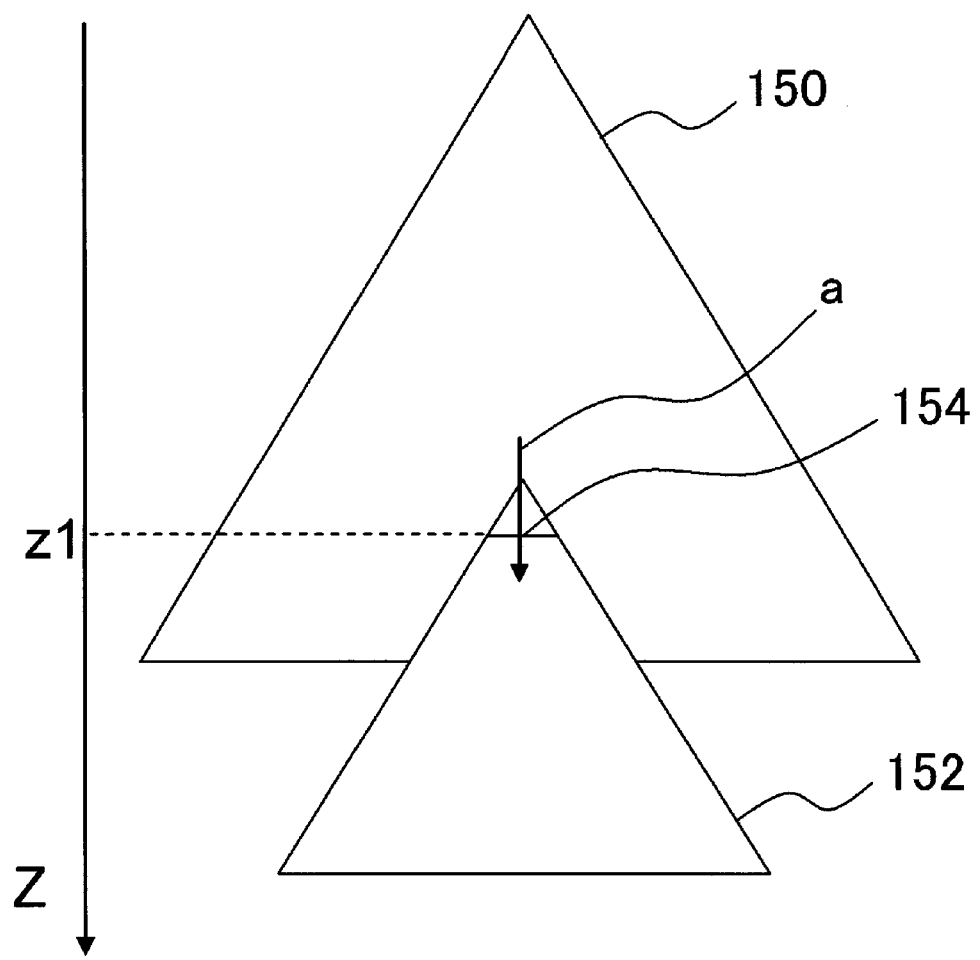
FIG. 7 schematically shows a relation between a plurality of sets of hierarchical data used for display according to the embodiment.

The process described so far concerns a mode in which the frame coordinates are moved in accordance with a user request to move an image in a virtual space formed by a single set of hierarchical data as shown in FIG. 5 so as to move, enlarge, or reduce the display area of the image. The embodiment further uses a plurality of sets of hierarchical data for display and allows a displayed image to go back and forth between the hierarchical data sets. FIG. 7 schematically shows a relation between a plurality of sets of hierarchical data used for display according to the embodiment.

Referring to FIG. 7, two triangles indicate different hierarchical data 150 and 152. Each of the hierarchical data 150 and 152 is actually configured such that different image data of different resolutions are discretely located in the Z-axis direction of the figure, as shown in FIG. 3. As described with reference to FIG. 5, when the user requests enlargement/reduction of a displayed image using an image movement request signal, the displayed image moves in a Z-axis direction of the figure. Meanwhile, the displayed image moves in the horizontal direction when the request is to move the displayed image upward, downward, leftward, or rightward. The embodiment generates a state in which the two sets of hierarchical data 150 and 152 overlap in the virtual space as shown.

When the user originates a request for enlargement while an image of the hierarchical data 150 is being displayed so that the displayed image is moved as indicated by an arrow a, the displayed image enters into the area of the hierarchical data 152. In other words, the displayed image moves between the hierarchical data sets. By including such a movement in the virtual space in the steps of displaying hierarchical data described above, images from different hierarchical data sets can be blended seamlessly and displayed accordingly. The hierarchical data 150 and 152 may comprise data representing the same object in different ranges of resolutions. Alternatively, they may represent completely different objects. For example, given that the hierarchical data 150 represents data for a world map and the hierarchical data 152 represents data for a Japanese map, transition from the hierarchical data 150 to the hierarchical data 152 takes place as the user enlarges an area of Japan in the world map. As a result, a detailed map of Japan will be shown. Alternatively, given that the hierarchical data 150 represents data for a menu screen and the hierarchical data 152 represents data for a manual that explains the icons displayed in the menu screen, a user request to enlarge a desired icon in the menu screen switches the display to the image of the manual explaining the function corresponding to the icon.

Thus, according to the embodiment, the hierarchical data used in rendering is switched, prompted by the movement of a displayed image in the virtual space, i.e., an input of a request for move, enlarge, or reduce the displayed image. Switching can take place only by using a basic operation for controlling an image currently displayed. This provides highly friendly user interface that does not require steps of, for example, displaying a menu screen for switching or selecting from the menu. For creation of a content that allows continuous enlargement from an image of a world map to a high-resolution image that gives a view of buildings or streets, the inventive approach saves data for a region (e.g., ocean region) that does not need enlargement, by maintaining separate hierarchical data depending on the required range of resolutions, and can reduce the data size significantly as compared with a case of building a single huge hierarchical data. Moreover, the inventive approach allows completely different images to be displayed continuously and so can be applied to a variety of image representation and content creation.

The area in the image currently displayed that initiates switching to a different set of hierarchical data, or the resolution that initiates the switching, are predefined as "link information" indicated by a line 154 in FIG. 7. In the illustrated example, switching from the hierarchical data 150 to the hierarchical data 152 takes place at a position characterized by the resolution z1 defined along the Z-axis and located on a horizontal plane denoted by a line 154 (see FIG. 3). Hereinafter, switching between hierarchical data sets will be referred to as "link".

Figure 8:
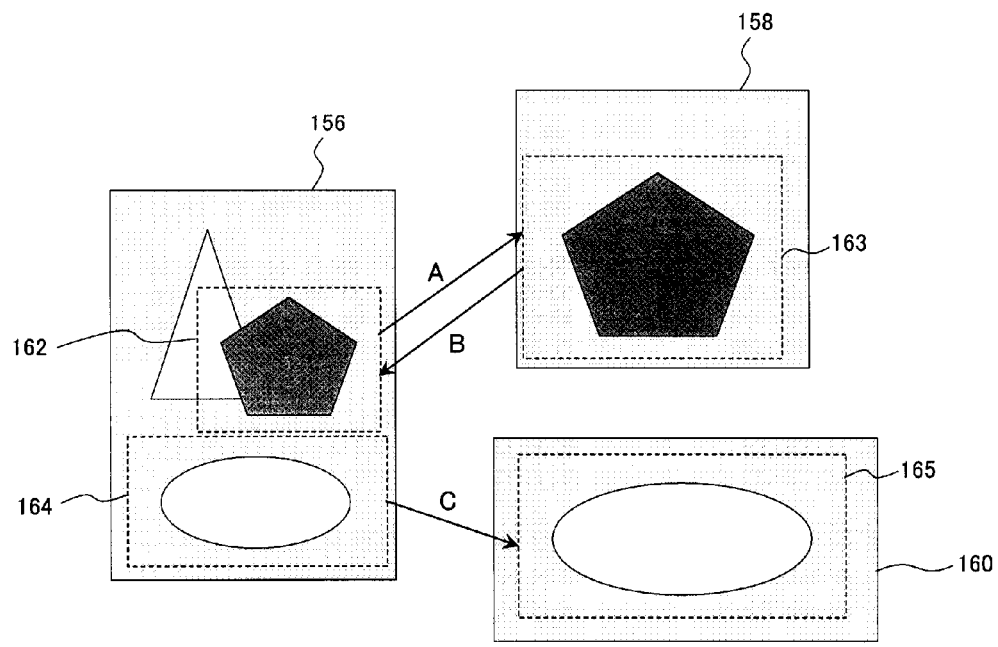
FIG. 8 illustrates how images are displayed when a link is established between hierarchical data sets according to the embodiment.

FIG. 8 illustrates how images are displayed when a link is established between hierarchical data sets. Referring to FIG. 8, three sets of hierarchical data, namely, images 156, 158, and 160 are used for display. It will be assumed that a link is established between an area 162 in the image 156 and an area 163 in the image 158, and a link is established between an area 164 in the image 156 and an area 165 in the image 160. Such areas will hereinafter be referred to as "link areas". A link area corresponds to the line 154 of FIG. 7. When a displayed image is being generated using the hierarchical data for the image 156 and when the displayed image overlaps the link area 162 in response to a user request to move the displayed image, the hierarchical data used for display is switched from the image 156 to the image 158 so that the link area 163 in the image 158 is displayed accordingly (arrow A).

In the example of FIG. 8, the hard disk drive 50 stores data for the image 158, which shows an area around the pentagon in the image 156 at a higher resolution, in the form of a different hierarchical data. The link area 162 and the link area 163 are configured to have the same angle of view. An image at a resolution higher than the highest resolution defined in the hierarchical data for the image 156 can be displayed using the hierarchical data for the image 158 in continuation from the image 156. In appearance, transition indicated by the arrow a of FIG. 7 occurs merely by zooming to the pentagon. Therefore, the user need not be aware of the switching of hierarchical data.

As shown in FIG. 8, a link indicated by an arrow B opposite in direction to the arrow A is also established between the link area 162 and the link area 163. When, after the transition A and the user enlarges a desired area in the image 158 and then reduces the displayed image or the like, the displayed image overlaps the link area 163 once again, the hierarchical data used for display is switched from the image 158 to the image 156 so that the link area 162 in the image 156 is displayed accordingly (arrow B). In this case, too, continuous reduction is possible merely by reducing the displayed image from the image 158 and without causing the user to be aware of the switching of hierarchical data.

Transition from the link area 164 to the link area 165 (arrow C) occurs similarly. When the image 156 is being displayed and when the displayed image overlaps the link area 164 by zooming into the ellipse, the hierarchical data is switched so that the link area 165 in the image 160 is displayed. This allows an image with a higher resolution than that of the image 156 to be displayed. A displayed image may be determined to "overlap" a link area even if the displayed image is not strictly aligned with the link area. Therefore, a rule that determines that overlapping occurs, for example, when the displayed image is located within a certain range from the link area, may be established.

Figure 9:
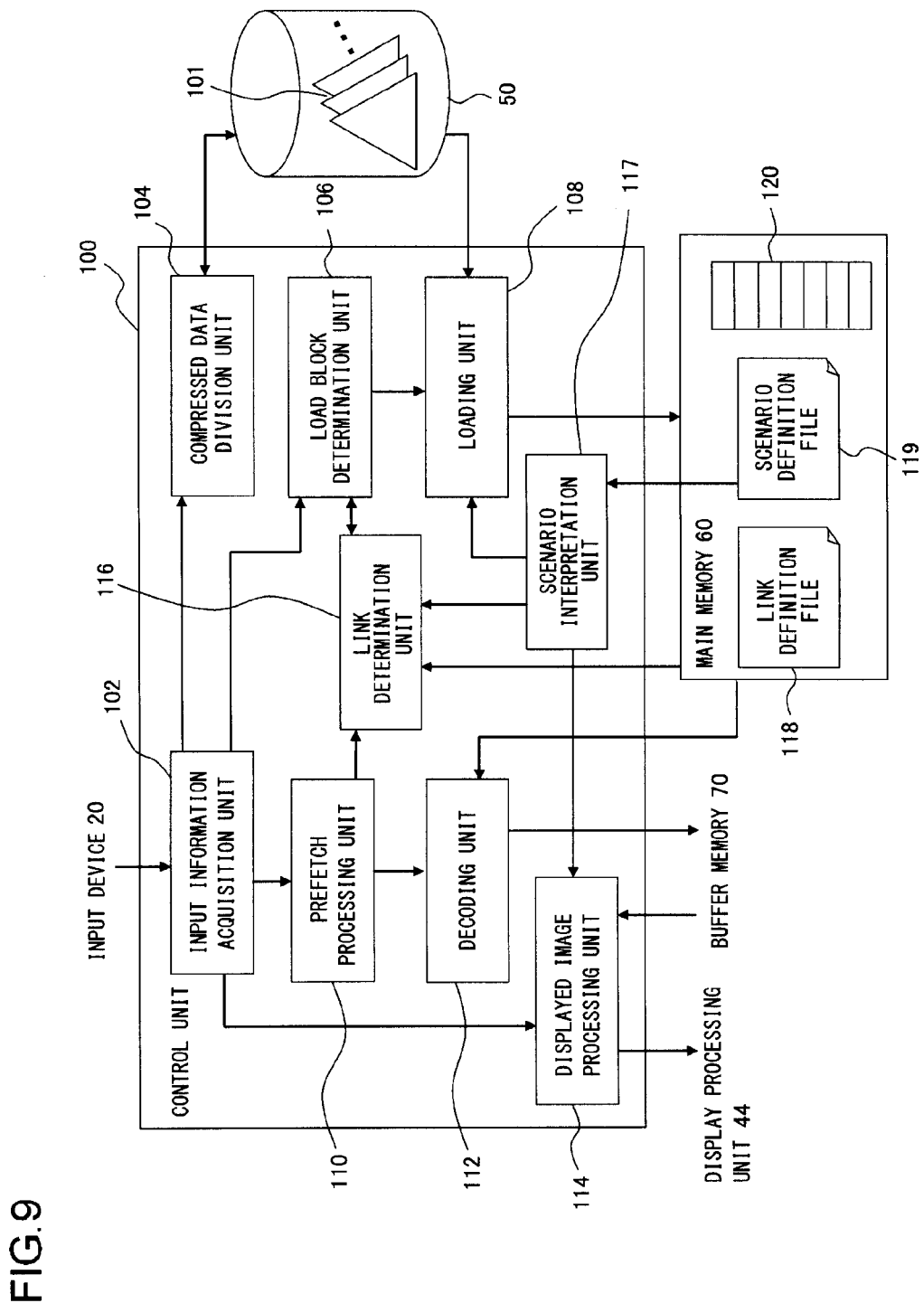
FIG. 9 shows the configuration of the control unit according to the embodiment in detail.

FIG. 9 shows the configuration of the control unit 100 in detail. The control unit 100 comprises an input information acquisition unit 102 for acquiring information entered by the user via the input device 20, a compressed data division unit 104 for dividing hierarchical data into image blocks, a loaded block determination unit 106 for determining an image block that should be newly loaded, and a loading unit 108 for loading a necessary image block from the hard disk drive 50. The control unit 100 further comprises a prefetch processing unit 110 for performing a prefetch process, a link determination unit 116 for determining whether the data that should be loaded or decoded is located in the hierarchical data at the destination of the link, a decoding unit 112 for decoding compressed image data, and a displayed image processing unit 114 for rendering a displayed image. The control unit 100 further includes a scenario interpretation unit 117 configured to interpret scenario information set up in the control unit and control the link determination unit 116, the loading unit 108, and the displayed image processing unit 114.

The elements depicted in FIG. 9. as functional blocks for performing various processes are implemented in hardware such as a central processing unit (CPU), memory, or other LSI's, and in software such as a programs etc., loaded into the memory. As describe above, the control unit 100 includes one PPU and a plurality of SPUs. The PPU and the SPUs form the functional blocks alone or in combination. Therefore, it will be obvious to those skilled in the art that the functional blocks may be implemented in a variety of manners by hardware only, software only, or a combination of thereof.

The hard disk drive 50 stores a plurality of sets of hierarchical data 101 in which links are set up. In addition to an area 120 for storing the image block loaded from the hard disk drive 50, the main memory 60 stores a link definition file 118. The link definition file 118 is a file that records link information established between hierarchical data sets. The link definition file as attached to the body of the hierarchical data 101 may be loaded from the hard disk drive 50. A description of a scenario definition file 119 stored in the main memory 60 will be described later.

The input information acquisition unit 102 acquires an instruction entered by the user via the input device 20 to start/terminate displaying an image, move the display area, enlarge or reduce the displayed image, etc. The input information acquisition unit 102 may delay the image movement request signal in accordance with the predefined maximum value of the speed with which to move the displayed image, the transfer function used for convolution of the image movement request signal, etc. The transfer function may be a Gaussian function. The image processing device 10 uses the delay to secure time for a process of prefetching image data, or time required to reconstruct the image or moving image at the link destination (described later) or to active an application. This allows smooth image display in response to a user request.

The compressed data division unit 104 reads hierarchical data from the hard disk drive 50, generates image blocks by dividing the data according to a predefined rule described later, and stores the divided data in the hard disk drive 50. For example, when the user uses the input device 20 to select one of the hierarchical data stored in the hard disk drive 50, the unit 104 acquires the information accordingly from the input information acquisition unit 102 and starts a dividing process. Alternatively, the hard disk drive 50 may store hierarchical data that is divided into image blocks right from the start. If such hierarchical data is used for display, the compressed data division unit 104 may not be operated.

The loaded block determination unit 106 verifies whether there are image blocks that should be loaded from the hard disk drive 50 into the main memory 60 or not, and determines the image block that should be loaded next, issuing a load request to a loading unit 108. In this process, the load block determination unit 106 places an inquiry to the link determination unit 116 to inquire whether the image block that should be loaded includes a image block of a different hierarchical data at the destination of the link, or not. The loaded block determination unit 106 performs the above-mentioned verification and determination according to a predefined timing schedule while the loading unit 108 is not performing loading process. For example, verification and determination may be performed when a predefined period of time elapses or when the user requests to move the image. The loading unit 108 performs an actual loading process in accordance with a request from the loaded block determination unit 106.

If the image block including the destination image area is not stored in the main memory 60 upon occurrence of the user request to move the displayed image, it is necessary to perform the steps of loading the image block from the hard disk drive 50, decoding the necessary area, and rendering the displayed image in one setting. The loading process may represent a bottle neck in this case, with the result that the response to the user request may become poor. In the embodiment, the following policies are observed to load blocks, namely, (1) image blocks are loaded so as to exhaustively cover areas that are highly likely to be displayed, (2) loading takes place on a steady basis so that heavy traffic for loading processes is prevented from occurring in a brief period of time.

The prefetch processing unit 110 predicts the image area expected to be needed for rendering of a displayed image in the future, in accordance with the frame coordinates of the currently displayed image and information related to the user request to move the displayed image, and supplies the resultant information to the decoding unit 112. However, prediction is not performed immediately after an image is started to be displayed, or when the destination image cannot be rendered using the image stored in the buffer memory 70. In these cases, the prefetch processing unit 110 supplies information on an area that includes the image currently necessary to render the displayed image to the decoding unit 112. The prefetch processing unit 110 places an inquiry the link determination unit 116 to inquire whether the predicted image area or the image area necessary to render the currently displayed image is included in the other hierarchical data set at the destination of the link, or not.

The link determination unit refers to the link definition file 118 stored in the main memory 60 and determines whether an image block in the hierarchical data at the destination of the link is included in the image block that should be loaded in response to the inquiry from the load block determination unit 106. If the image block is included, the link determination unit 116 converts the coordinates of a point in the currently displayed hierarchical data that should be loaded into the coordinates defined in the hierarchical data at the destination of the link and returns the converted coordinates to the load block determination unit 106 along with the pre-conversion coordinates and the file name of the hierarchical data at the destination of the link. The link determination unit 116 also determines whether the area necessary for rendering includes an area in the hierarchical data at the destination of the link in response to an inquiry from the prefetch processing unit 110. If an area is included, the link determination unit 116 returns information related to the coordinates of the link area at the destination of the link. An example of setting a link will be described later.

The decoding unit 112 reads and decodes a part of the compressed image data from the main memory 60 by referring to the information on the image area acquired from the prefetch processing unit 110 and stores the decoded data in the decoding buffer or the display buffer. The displayed image processing unit 114 determines the frame coordinates of the new displayed image in accordance with user request to move the displayed image, reads the corresponding image data from the display buffer of the buffer memory 70, and renders the image in the frame memory 90 of the display processing unit 44. The scenario interpretation unit 117 interprets the scenario file 119 stored in the main memory 60 and controls the displayed image in order to achieve continuous transition in the displayed image. Details will be described later.

Figure 10:
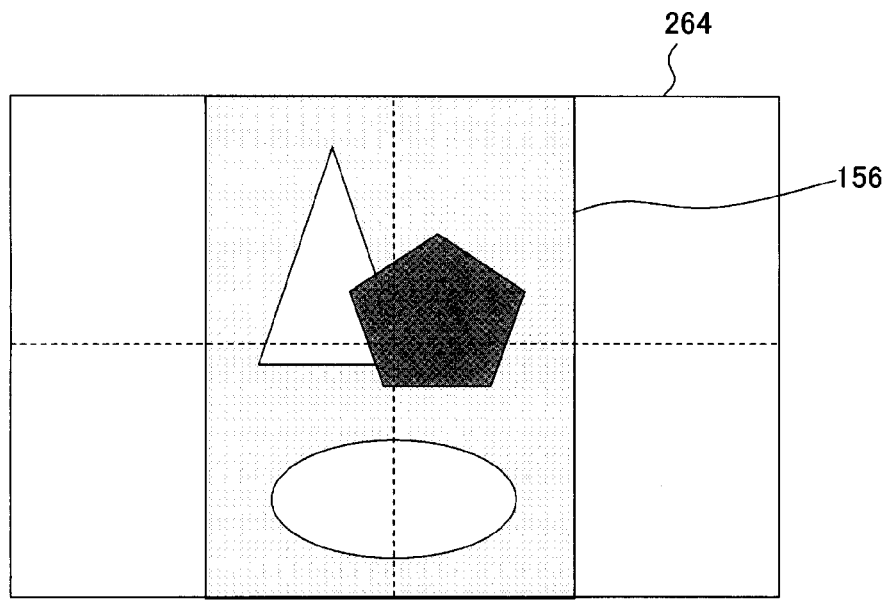
FIG. 10 shows a relation between a reference frame and an image according to the embodiment.

A description will now be given of an example of setting a link. FIGS. 10-13 show a method of defining an area (frame) in an image. FIG. 10 shows a relation between a reference frame and an image. Referring to FIG. 10, a reference frame 264 for an image 156 has a center that is aligned with the center of the image 156 and is formed as a rectangle circumscribing the image 156 and having a predetermined aspect ratio. The aspect ratio may have a predetermined value. For example, the aspect ratio may be identical to the aspect ratio of the display displaying the image or the aspect ratio of the display area on the display. It will be set that the frame maintains the ratio even when the displayed image is enlarged or reduced. The frame is defined using four parameters including a horizontal offset, a vertical offset, a magnification factor, and an angle of rotation from the reference frame. The reference frame 264 is such that (horizontal offset, vertical offset, magnification factor, rotation angle)=(0, 0, 1.0, 0).

Figure 11:
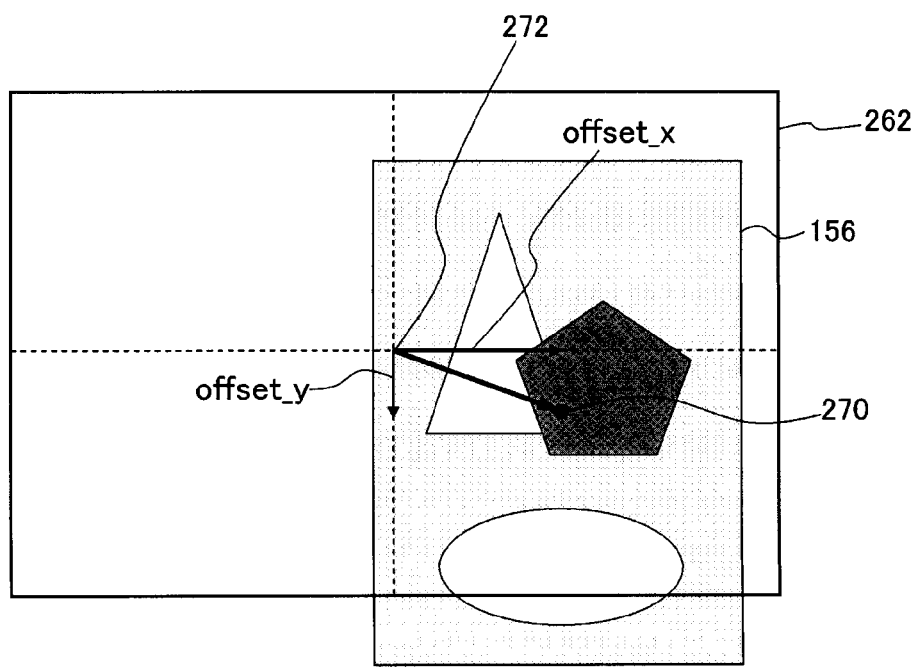
FIG. 11 describes how frame is defined when the reference frame is translated according to the embodiment.

FIG. 11 describes how frame is defined when the reference frame is translated. In this case, values are substituted into the vertical offset parameter and the horizontal offset parameter. More specifically, the horizontal component offset_x and the vertical component offset_y of the distance from the center of a frame 272 to the center 270 of the image 156, i.e., the center of the reference frame, represent the values of the horizontal offset and the vertical offset, respectively. Therefore, the frame 262 is represented as (offset_x, offset_y, 1.0, 0).

Figure 12:
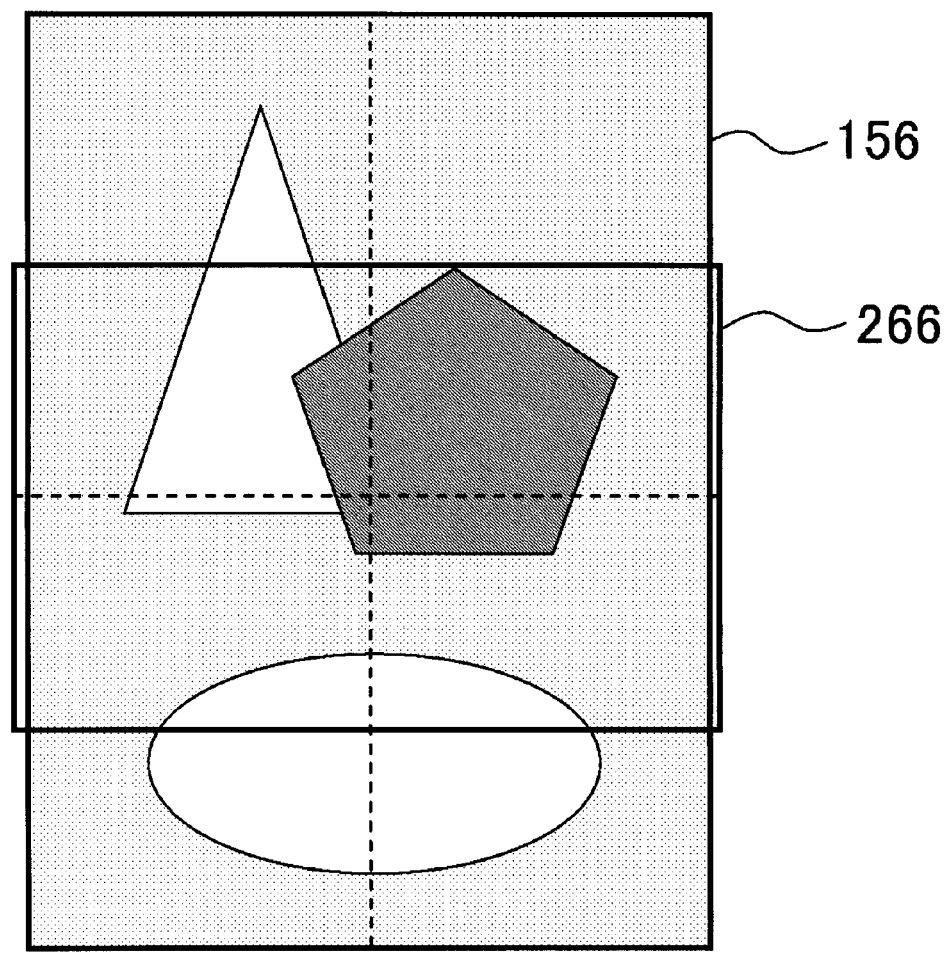
FIG. 12 shows how a frame is defined when the reference frame is not translated but only the magnification factor is changed according to the embodiment.

FIG. 12 shows how a frame is defined when the reference frame is not translated but only the magnification factor is changed. In this case, the magnification factor of a frame 266 with respect to the reference frame is substituted into the magnification factor parameter. If the frame 266 of FIG. 12 is 0.5 times the reference frame of FIG. 10 in size, the frame 266 is represented as (0, 0, 0.5, 0).

Figures 13, 14:
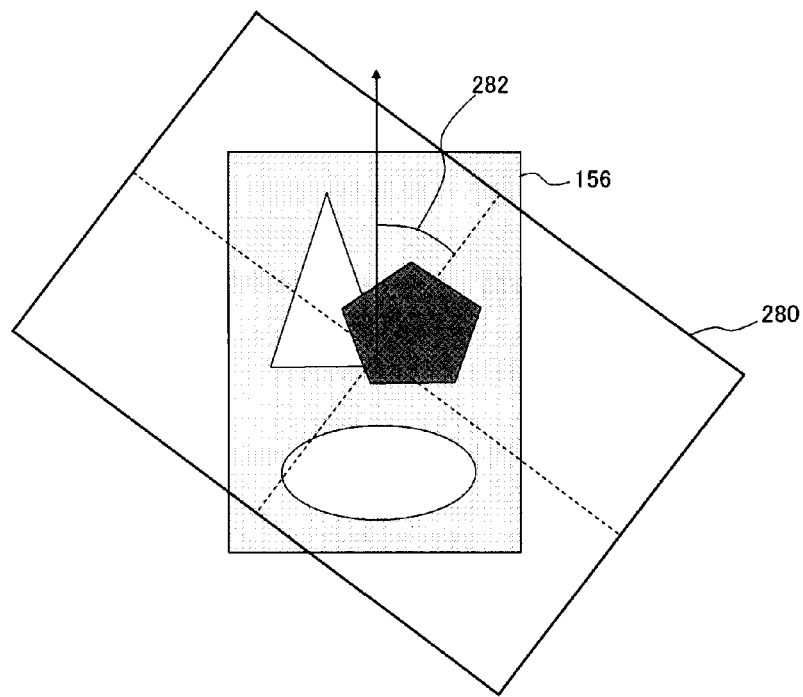
FIG. 13 shows how a frame is defined when the reference frame is not translated but rotated according to the embodiment.
FIG. 14 shows an example of data structure of a link definition file according to the embodiment.

FIG. 13 shows how a frame is defined when the reference frame is not translated but rotated. In this case, the angle of rotation 282 of a frame 280 with respect to the reference frame is substituted into the rotation angle parameter. For example, if the rotation angle 282 is 0.25π, the frame 280 is represented as (0, 0, 1.0, 0.25). By combining the offsets, magnification factor, and rotation angle of FIGS. 11-13, the frame for the displayed image is represented by four parameters without exception. The set of four parameters will hereinafter be referred to as "frame definition parameters".

FIG. 14 shows an example of data structure of a link definition file 118. One row of the link definition file 118 corresponds to a link, i.e., to a description of switching from a given hierarchical data set to another. Each row comprises four fields including a link source image frame field 302, an effective scale range field 304, a link destination file field 306, and a link destination image frame field 308. The link source image frame field 302 designates a displayed area in the image being displayed at which switching of hierarchical data sets occurs, i.e., a link area, using the above-mentioned frame definition parameters. For example, the frame as defined in the illustration corresponds to the frame of the link area 163 at the source of the link indicated by the arrow B in FIG. 8.

The effective scale range field 304 designates a range of magnification factors in which the link is effective. The range starts with the magnification factor defined in the link source image frame field 302. Referring to the first row of FIG. 14, the magnification factor of the link area indicated in the link source image frame field 302 is "2.0" and the value of the effective scale range field 304 is "98.0". Therefore, the link is defined as being effective and switching of hierarchical data sets occurs provided that the magnification factor of the displayed image is 2.0-100.0.

For example, referring to the link shown by the arrow B in FIG. 8, the image 158 is switched to the image 156 upon zoom-out of the displayed image, i.e., when the frame magnification factor is started to be increased while a frame smaller than the link area 163 in the image 158 is being displayed until the frame is aligned with the link area 163. Therefore, a positive value is defined in the effective scale range field 304 in order to active the link when the magnification factor is 2.0 or greater. This will allow the link to be effective even when the image 158 is displayed at an enlarged magnification factor and then the displayed image is moved closer to the link area 163.

Meanwhile, referring to the link shown by the arrow A in FIG. 8, the image 156 is switched to the image 158 upon zoom-in of the displayed image, i.e., when the frame magnification factor is started to be decreased while a frame larger than the link area 162 in the image 156 is being displayed until the frame is aligned with the link area 162. Therefore, a negative value such as "−1.0" is defined in the effective scale range field 304, as indicated at the second row in FIG. 14. The link destination file field 306 designates the file name of the hierarchical data at the destination of the link. In the example of the link indicated by the arrow B in FIG. 8, the file name of the hierarchical data for the image 156. The link destination image frame field 308 designates the frame definition parameters of the image displayed when the hierarchical data is switched, i.e., the frame of the link area at the destination of the link.

A link definition file is created for each set of hierarchical data at the source of the link. For example, information on the links indicated by the arrows A and C in FIG. 8 are described in the link definition file for the hierarchical data 156, and information on the link indicated by the arrow B is described in the link definition file for the hierarchical data 158. The files are stored in association with the corresponding hierarchical data. In this way, links established bidirectionally can behave independently. For example, the link areas A and B involved in the transition indicated by the arrow A in FIG. 8 and the link areas A and B involved in the transition indicated by the arrow B may be different in the area and the resolution. In the example of FIG. 8, no link definition files are established for the image 160. Therefore, the user is expected to enjoy himself or herself by displaying the image 160 after making a transition to the image 160.

Once such a link definition file is created, the link determination unit 116 can verify whether the area predicted to be used through a prefetch process includes the link area defined in the link definition file, in response to an inquiry from the prefetch processing unit 110. If the link area is included, the link determination unit 116 returns the file name of the hierarchical data at the destination of the link, and the frame definition parameters of the link area at the destination of the link. The prefetch processing unit 110 delivers the information to the decoding unit 112 as in the case where the link area is not included. The decoding unit 112 reads the data for the link area at the destination of the link from the main memory 60 and decodes the read data.

Further, the link determination unit 116 verifies whether the point that should be loaded is included in the link area in response to an inquiry from the load block determination unit 106. If the link area is included, the link determination unit 116 returns the file name of the hierarchical data at the destination of the link. In this process, the coordinates of the point to be loaded defined in the image at the source of the link are converted into coordinates in the image at the destination of the link and the resultant coordinates are also returned. Of the hierarchical data for the image at the destination of the link, the load block determination unit 106 loads the image block including the point that should be loaded and of which coordinate is obtained by the conversion from the hard disk drive 50 into the main memory 60.

Figure 15:
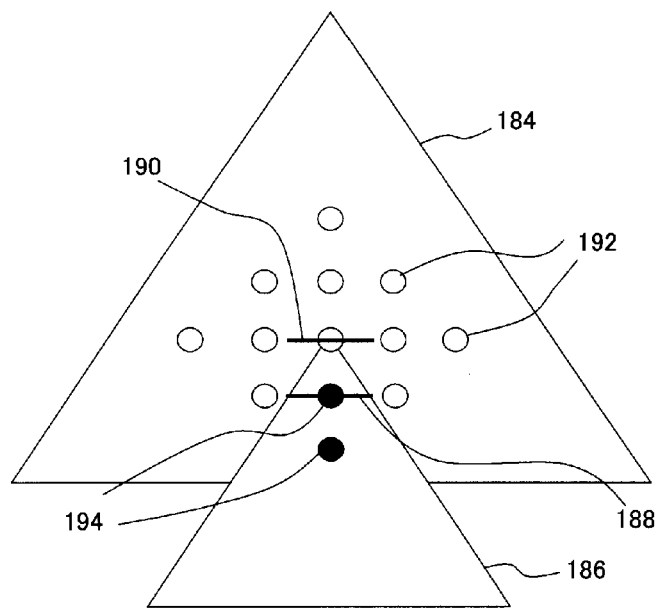
FIG. 15 schematically shows points that should be loaded when a link is established between two sets of hierarchical data according to the embodiment.

A description will now be given of the process of loading an image block by the load block determination unit 106 and the link determination unit 116. FIG. 15 schematically shows points that should be loaded when a link is established between two sets of hierarchical data. Basically, it is desirable that compressed data for an image surrounding the currently displayed image be loaded into the main memory 60. By using the term "surrounding", the neighborhood in the vertical and horizontal direction (X-axis, Y-axis) in the image of a layer and in the direction of the depth (Z-axis) of the hierarchical structure may be encompassed. The neighborhood in the Z-axis direction signifies enlarged or reduced images that include the displayed image or the neighborhood thereof.

Referring to FIG. 15, two triangles indicate different hierarchical data 184 and 186, as in FIG. 7. A link indicated by a line 188 is established between the hierarchical data 184 and 186. Provided that the currently displayed image is denoted by 190, the image block that includes points indicated by blank circles 192 and solid circles 194 in the figure is loaded into the main memory 60. In other words, of a predetermined number of layers above and below the currently displayed layer, several points within a predetermined range from the currently displayed image area are determined as being points that should be loaded.

In the example of FIG. 15, five points in the same layer as the displayed image, three points in the layer immediately above or below the currently displayed layer, and one point in the layer two steps above or two steps below are indicated by blank circles 192 and solid circles 194. In practice, more points are determined in the horizontal plane of the figure. Provided that a link as indicated by the line 188 is established, points in the layer immediately below the hierarchical data 184 originating the currently displayed image that are determined as points that should be loaded are included the link area. Therefore, the image block of the hierarchical data 186 including the points corresponding to the points determined in the hierarchical data 184 is loaded. The same is true for the points determined in the layer two steps below that should be loaded. Referring to FIG. 15, points that are determined in the currently displayed hierarchical data 184 and that should be loaded are indicated by blank circles 192, and points subjected to conversion into the coordinates in the hierarchical data 186 at the destination of the link are indicated by solid circles 194.

Determination of points that should be loaded and loading of the image block including the points may be performed on a steady basis at predetermined time intervals. To allow data for a necessary area to be loaded, image blocks are stored in the hard disk drive 50 such that the hard disk drive 50 also stores information mapping an area in an image of each image block to an area storing the image block. Similarly, the main memory 60 stores information mapping an area in an image in each image block to an area storing the image block. The load block determination unit 106 periodically verifies whether the image block including the point that should be loaded is stored in the main memory 60. If the image block is not stored, the load block determination 106 determines the image block as a target of loading. By loading image blocks steadily, wait time to display an image required as a result of a loading process is reduced.

If, as shown in FIG. 15, the point that should be loaded is newly included in the hierarchical data 186 for the image at the destination of the link, the data for the link destination may be loaded in preference to the currently displayed hierarchical data 184. This allows a new image at the destination of the link to be displayed smoothly even if transition to the link destination occurs immediately.

Figure 16:
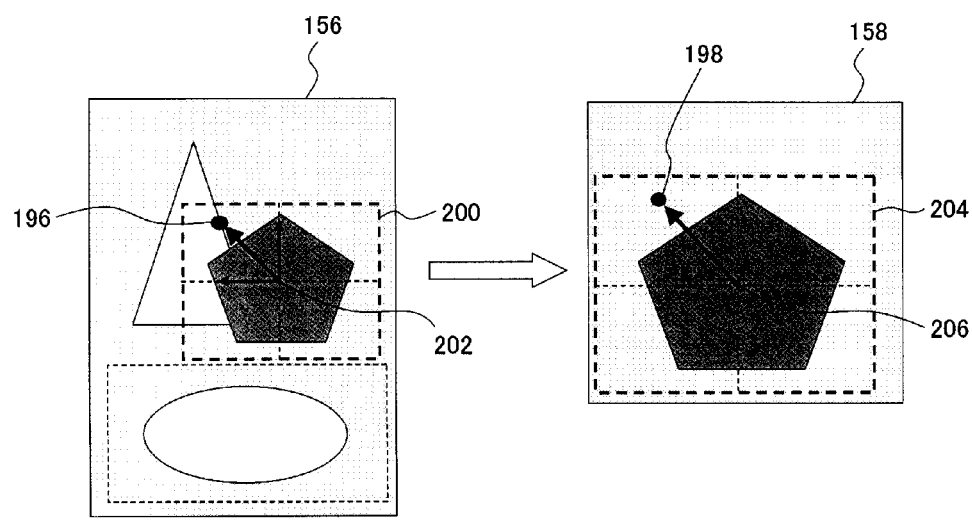
FIG. 16 shows a method of converting XY coordinates in the image at the source of the link into those of the image at the destination of the link according to the embodiment.

A description will now be given of a method of converting coordinates of a point that is defined in the hierarchical data at the source of the link and that should be loaded into coordinates defined in the hierarchical data at the destination of the link. FIG. 16 shows a method of converting XY coordinates in the image at the source of the link into those of the image at the destination of the link. Referring to FIG. 16, it will be assumed that a link is established such that a link area 200 in the image 156 is switched to a link area 204 in the image 158, and that a point 196 defined in the image 156 corresponds to a point 198 defined in the image 158. Given that the coordinates of the point 196 is (Pa_x, Pa_y), the length of a side of the link area 200 is (La_sx, La_sy), the coordinates of the center of the area is (La_x, La_y), the coordinates of the point 198 is (Pb_x, Pb_y), the length of a side of the link area 204 is (Lb_sx, Lb_sy), the coordinates of the center of the area is (Lb_x, Lb_y), the following expressions holds.

$$La\_sx:(Pa\_x-La\_x)=Lb\_sx:(Pb\_x-Lb\_x) \quad \text{(expression 1)}$$

$$La\_sy:(Pa\_y-La\_y)=Lb\_sy:(Pb\_y-Lb\_y) \quad \text{(expression 2)}$$

Therefore, the coordinates of the point 198 are determined as follows.

$$Pb\_x=(Lb\_sx/La\_sx)\times(Pa\_x-La\_x)+Lb\_x \quad \text{(expression 3)}$$

$$Pb\_y=(Lb\_sy/La\_sy)\times(Pa\_y-La\_y)+Lb\_y \quad \text{(expression 4)}$$

Figure 17:
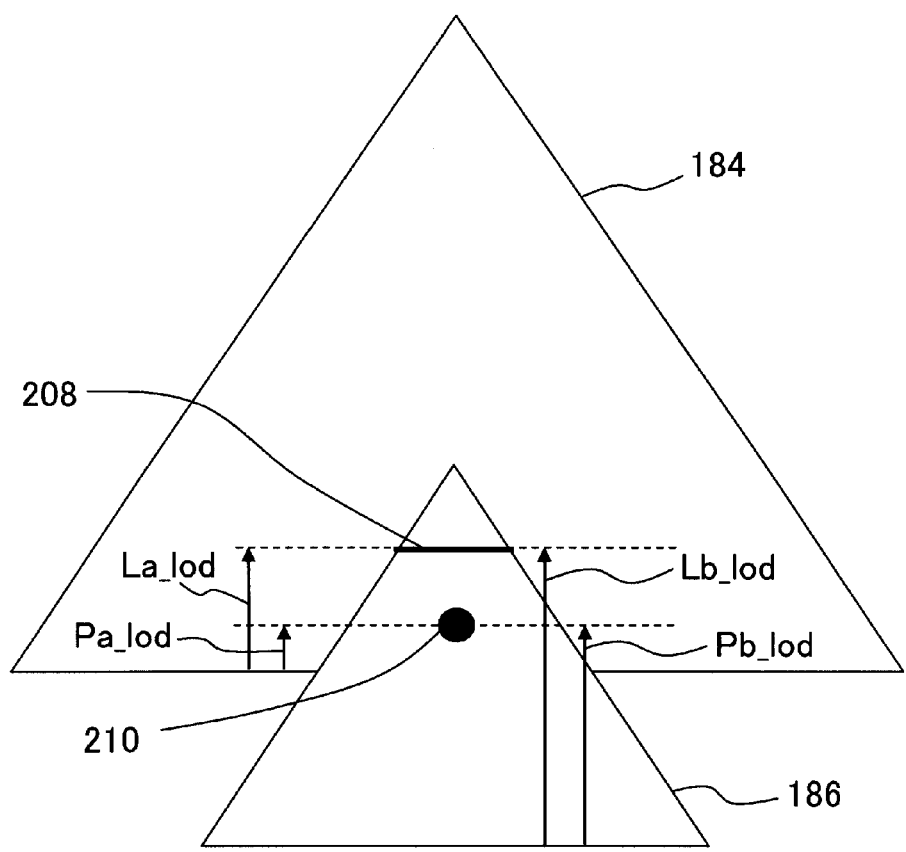
FIG. 17 shows a method of converting the Z coordinate in the image at the source of the link into that of the image at the destination of the link.

FIG. 17 shows a method of converting the Z coordinate in the image at the source of the link into that of the image at the destination of the link. It will be assumed that a link indicated by a line 208 is established between the hierarchical data 184 and the hierarchical data 186. In other words, the position of the line 208 represents a link area in the hierarchical data 184 and a link area in the hierarchical data 186. A variable "lod" is defined as follows.

$$lod=\log_2 Np$$

where Np denotes the number of pixels, of those pixels in the image at the bottom of the hierarchy, i.e., the image with the highest resolution, that are included in a width of a single pixel in an image of a target resolution. Therefore, the variable lod is an indicator indicating the displacement from the bottom of a triangle representing the hierarchical data. The variable has a common axis in the Z-axis direction not dependent on the number of layers included in the hierarchical data.

Meanwhile, the displacement from the magnification/reduction factor at the link area indicated by the line 208 to the magnification/reduction factor at the point subject to conversion does not depend on the hierarchical data. It will be assumed that the value of lod in the link area is defined as a value occurring when the area is displayed in the screen in a full size. Referring to FIG. 17, given that the values of lod of the link areas defined in the hierarchical data 184 and 186 are denoted by La_lod and Lb_lod, respectively, and that the values of lod of a point 210 subject to conversion is denoted by Pa_lod and Pb_lod, the following expressions hold due to the aforementioned property.

$$Pa\_lod-La\_lod=Pb\_lod-Lb\_lod \quad \text{(expression 5)}$$

Therefore, $$Pb\_lod=Lb\_lod+(Pa\_lod-La\_lod) \quad \text{(expression 6)}.$$

Using expressions 3, 4, and 6, the coordinates of points that are defined in the hierarchical data originating the currently displayed image and that should be loaded into coordinates defined in the hierarchical data at the destination of the link. However, Pb_lod is not necessarily located in the layer in the hierarchical data 186 that contains image data. Therefore, in practice, the data for the layer closest to the position derived from Pb_lod shall be loaded.

In the examples described above, two sets of hierarchical data are dealt with as targets of display. When the displayed image reaches an area and magnification factor predefined in one of the images, the other image is displayed. In other words, the device according to the embodiment is capable of displaying an object shown in another image on an enlarged scale or displaying a totally different content, prompted by an input of a request to move the displayed image. Three or more sets of hierarchical data may be the targets of display. Alternatively, links may be established cyclically such that the initial image is again displayed as the magnification factor is enlarged. In this case, as a plurality of sets of hierarchical data for which sequentially links are established are enlarged in succession, the initial hierarchical data may be displayed. Alternatively, as a given set of hierarchical data is enlarged, the display may return to a reduced version of the initially displayed image. In the latter case, the link destination file field in the link definition file of the hierarchical data may designate the file name for the hierarchical data itself.

Using the above-described configuration, the following types of display are possible.

1. Continuous transition between image showing the same target but having significantly different scales (e.g., enlargement of a world map and transition of the display to Japan, a prefecture, a city, a town, and a building.
2. Transition to the display of information (e.g., user guide) associated with an icon displayed in a menu screen of a game device or the like and indicating an option of selection, occurring as the icon is enlarged.
3. Transition to the content of a book as one of listed front covers of books (e.g., back number of a magazine) is enlarged.
4. Transition of the display to the interior of an object (e.g., pupil of a person) in an image or a scenery captured in the image as the object is enlarged; transition to an image different from the initial image as the image at the destination of transition is reduced.

In this embodiment, a prefetch process predicts a change in the displayed image to a link area. The neighborhood around the currently displayed image in the virtual space is loaded into the memory regardless of the hierarchical data. This configuration reduces the likelihood of a delay in the display due to a loading process or a decoding process, allowing continuous transition, even if the transition of display is to an image in a different set of hierarchical data.

By delaying the generation of a displayed image by subjecting a transfer function and a user signal requesting to move an image to convolution, smooth switching between images can be presented by adjusting the transfer function. In particular, when the image at the source of the link and the image at the destination of the link contain different contents (e.g., when a manual is displayed), smooth switching may be presented by applying any of generally known visual effects used in a switcher adapted for moving images (e.g., cross fade, dissolve, wipe, and page flipping using polygon mesh) to the images.

Moving image data may be defined as the destination of a link. In this case, the destination of the link may be considered as hierarchical data comprising a single layer of moving image data. For example, a link to the moving image data may be defined in an area in a still image. The data structure as shown in FIG. 14 may be used in the link definition file. The link destination file field 306 designates the file name of the moving image file. If the resolution and display area of the moving image are fixed, the link destination image frame field 308 may be invalidated. By establishing such a link, when the link area thus defined in the image currently displayed is predicted to be displayed subsequently in the prefetch process as described above, the designated moving image file is started to be encoded. Alternatively, encoding may continue regardless of the prediction.

The feature described above may be used to add flair to the display. For example, several still images (e.g., gravure pictures) may be displayed in the screen such that an animal in the image starts to move by zooming to a given still image. Similarly, an application file may be designated in the link destination file field 306 in the link information so that the application is started by zooming into a certain area in the image.

Figure 18:
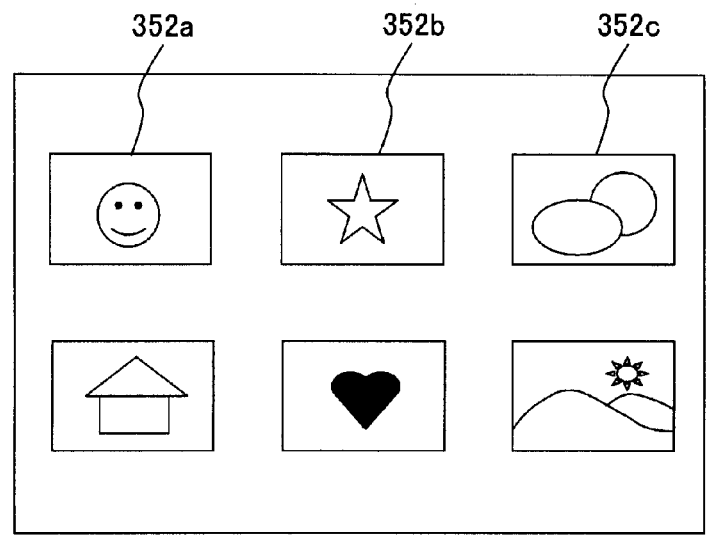
FIG. 18 shows an example of an image in which a link area is defined according to the embodiment.

FIG. 18 shows an example of an image in which a link area is defined. A plurality of link areas 352a, 352b, and 352c are defined in an image 350. By zooming to the link area 352a, a detailed image of the area or related information is displayed, moving images are played back, or an application is started. If the link areas are limited as in the image 350, the user may be guided to move the displayed image in order to reduce the user trouble required for alignment. Even if the link areas are not limited, such a function is useful to guide the displayed image according to predefined intention.

To provide the guidance function, a frame definition parameters used in the link information are used. In other words, a file like that of link information is prepared in which frame definition parameters in the format (horizontal offset, vertical offset, magnification factor, rotation angle) are defined for each area to which the display should be guided (hereinafter, referred to as guidance area). The file is stored as a scenario definition file 119 in the main memory 60 of FIG. 9. When the display area enters into a predetermined range in the virtual space with respect to a frame defined in the scenario definition file 119, the displayed image is guided to the guidance area. The process is achieved through the steps as already described above by virtually generating a signal requesting movement of an image to the guidance area. The "predetermined range" is also defined in the scenario definition file using frame definition parameters.

This allows the displayed image to be guided to the link area 352a only by a user operation to bring the displayed image close to the link area 352a. As a result, transition to the destination of the defined link is facilitated and the operability is improved. In this embodiment, transition to another image at the destination of the link, playback of moving images, or activation of an application takes place in response to the movement of the displayed image in the virtual space. Therefore, user intention can be predicted through a prefetch process that predicts the movement. Therefore, decoding of another image, decoding of moving image data, or activation of an application can be performed speculatively before actually switching the display to the destination of the link. In this way, actual time required between a request for switching between images and an output of the requested image can be considerably reduced as compared with the related-art approach of starting a process after selecting an icon using a pointer.

Figure 19:
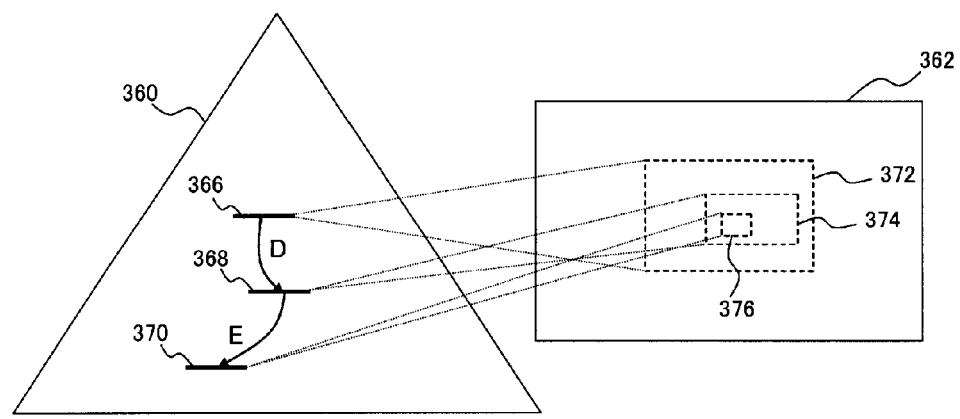
FIG. 19 shows how the displayed image is guided within a given hierarchical data according to the embodiment to effect transition between different layers for display.

The example given above concerns detection of user intent to move to a destination of a link and guidance of the displayed image to the link area. Meanwhile, a similar configuration may be used to guide the displayed image regardless of whether the link area is established. FIG. 19 shows how the displayed image is guided within a given hierarchical data to effect transition between different layers for display. Referring to FIG. 19, hierarchical data 360 corresponds to an image 362. It will be assumed that guidance areas 374 and 376 indicate by lines 368 and 370, respectively, are defined in the scenario definition file 119 using frame definition parameters and that an area 372 currently displayed corresponds to a line 366.

As the user enlarges the displayed image, starting in the area 372, the displayed image is guided to the guidance area 374 (arrow D) when the displayed image enters into a predetermined range from the guidance area 374. When the enlargement continues and the displayed image enters into a predetermined range from the guidance area 376, the displayed image is guided to the guidance area 376 (arrow E). The mode of display as described above can be used for various purposes depending on the content of image displayed.

For example, the user may wish to enlarge only a selected area in a scenery photo or a portrait. However, with the related-art technology for enlarging or reducing the screen, an attempt to enlarge a desired area may result in undesired portion of the image being displayed and it may be difficult to search for the desired area at the magnification factor then in use. By registering a scenario definition file for an area predicted to be enlarged as taught in this embodiment, the area can be accurately enlarged as the user moves the displayed image roughly toward that area and enters a request for enlargement. Guidance of the displayed image to the guidance area may not only occur when the displayed image is in the neighborhood of the guidance area. For example, the display area may be moved when a predetermined button is pressed regardless of the position of the currently displayed image.

Figure 20:
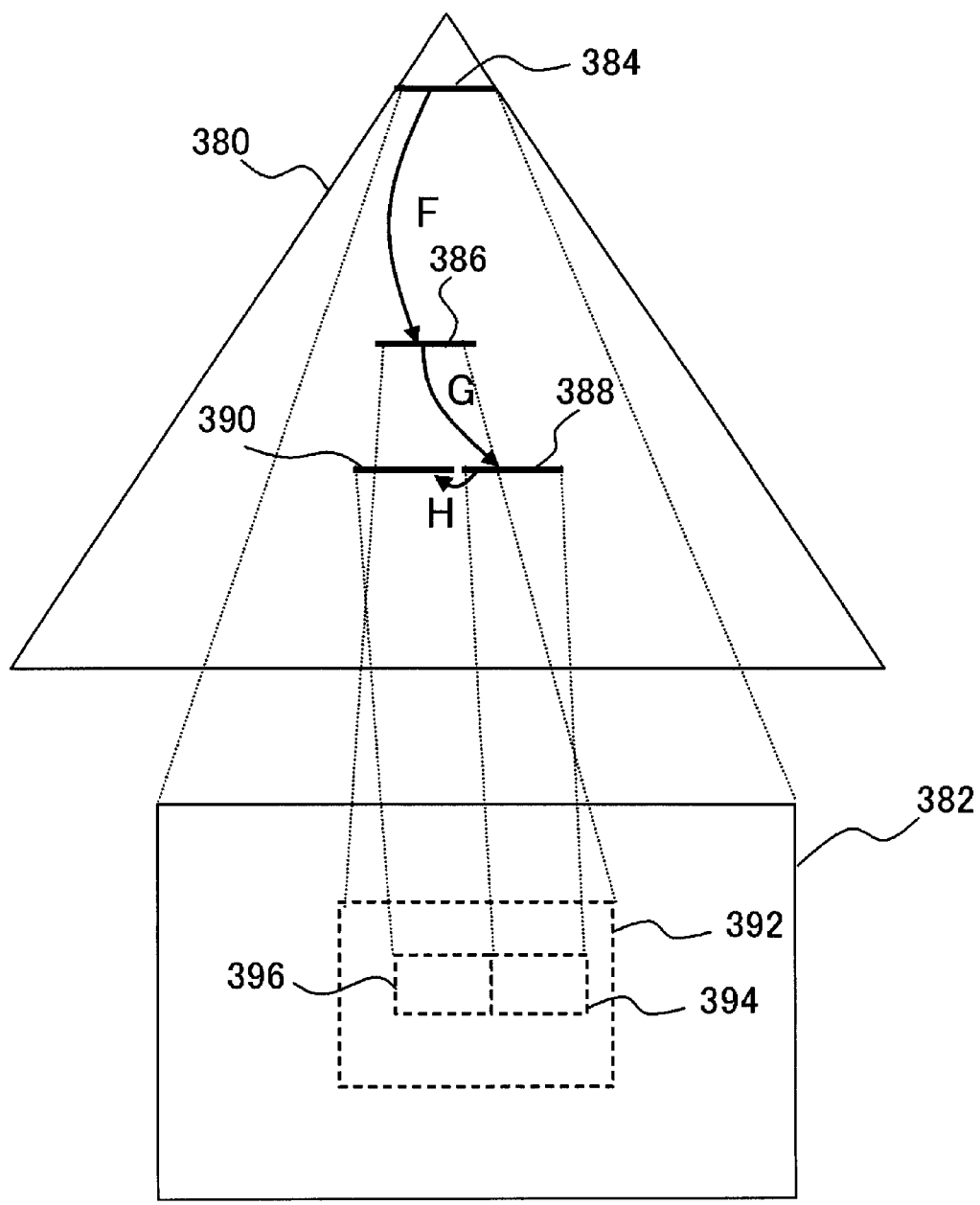
FIG. 20 shows how the displayed image undergoes transition when guidance to a different layers and guidance to another area in the same layer are combined according to the embodiment.

Guidance may occur not only to a different layer. The sequence of display within the same layer may be designated in the guidance. FIG. 20 shows how the displayed image undergoes transition when guidance to a different layer and guidance to another area in the same layer are combined. For example, it assumed that a single page of newspaper or a magazine is displayed using the hierarchical data 380. An area containing characters expected to be browsed upon enlargement is defined as guidance area article by article. Referring to FIG. 20, a guidance area 392 indicated by a line 386 represents such an area. Further, a plurality of guidance areas are defined so that the user can track the article from start to end in a layer having the resolution that allows the user to decipher characters. A guidance area 394 indicated by a line 388 and a guidance area 396 indicated by a line 390 are such areas.

The user initially displays an area 382 of the entirety of the page indicated by a line 384 and then enlarges the displayed image by bringing it closer to a desired article. This will guide the user to the guidance area 392 defined in the article (arrow F). Further enlargement results in guidance to the guidance area 394 at the head of the article (arrow G). As the user reading the sentence in the guidance area 394 designates a direction or presses a predetermined button, the user is guided to the guidance area 396 showing the continuation of the article (arrow H).

In defining transition of the display area within the same layer, the sequence of display is defined as well as frame definition parameters. Further, a control key for designating the movement of the display area as described above is defined. For example, in the case of sentences in a multiple column layout (e.g., a newspaper article), the display area need to be moved from right to left, followed by the movement of the area below from right to left again. By defining the display areas and the sequence of displaying the same in advance, the user need not look for a position in an enlarged image to which the displayed image should be moved. As described above, guidance may occur when the currently displayed image enters into a predetermined range from the guidance area even in the case of movement within the same layer.

FIGS. 19 and 20 show transition of the displayed image within a given hierarchical data set for brevity. If a link to another hierarchical data set is defined in the transition, the display should naturally make transition to the other hierarchical data. The above-described example is directed to guiding the displayed image when the user enters a request to move, enlarge, or reduce the image. The embodiment also requires providing the function of causing the displayed image to make transition to a registered guidance area at predetermined time intervals. In this case, the user may only need to enter a request to run such a mode. The function provides a novel method of presenting source still images as if they are moving images. For example, the function enables showing images for promoting the sale of a magazine, or continuous browsing of photos.

Figure 21:
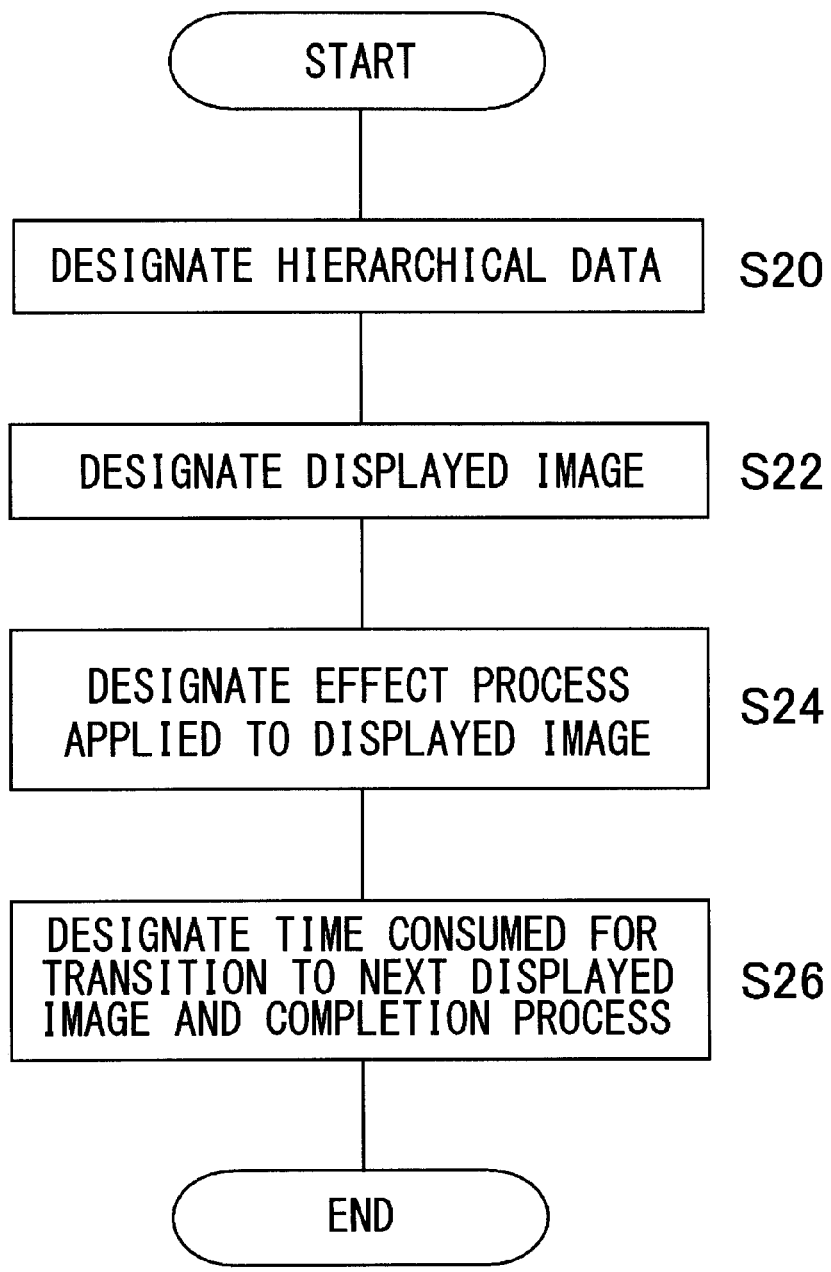
FIG. 21 is a flowchart showing the flow of steps executed when the scenario definition file according to the embodiment describes a process of controlling transition between images in further detail.

When the displayed image is caused to make such a transition automatically, the frame definition parameters, the sequence of display, and the display time of each images are defined in the scenario definition file 119. In this case, the scenario definition file 119 may describe a process for detailed control of the transition of the image using a markup language such as XML. In this process, the scenario interpretation unit 117 reads the script from the main memory 60, interprets the script, and controls the displayed image by requesting the displayed image processing unit 114, the link determination unit 116, and the loading unit 108 to perform a process as appropriate. FIG. 21 is a flowchart showing the flow of steps described in this case.

Firstly hierarchical data is designated (S20). A single set of hierarchical data representing a single image may be designated. Alternatively, a block of a plurality of sets of hierarchical data in which a link is defined may be designated. Subsequently, the image to be displayed is designated using frame definition parameters (S22). Further, an effect process applied when the image is displayed is designated as appropriate (S24). If another image is displayed previously, a cross fade process may be designated, or a process of reducing the previous image progressively and enlarging the current image may be designated. Time consumed for transition to the display of next image and the process for complementation between the current image and the next image are designated (S26). For example, the "next image" may be an image in the same hierarchical data but in a different layer (e.g., an enlarged version or a reduced version of the current image) or an image at the destination of the link. Alternatively, the "next image" may be an image in another set of hierarchical data.

A method generally used in animation technique may be employed as a method of complementation between images, by using the current image and the next image as key frames. Steps S20 and S26 may be grouped into a block. The scenario is written to repeat the block if there are images in a different set of hierarchical data that are desired to be displayed in succession. By allowing the prefetch processing unit 110 to read the scenario definition file 119 thus written, a virtual request to move the image is generated as in the case where the user provides a request to move the image. The prefetch processing unit 110 places an inquiry to the link determination unit 116 and requests the decoding unit 112 to perform a decoding process. This will easily achieve a mode of display in which the designated images changes as the displayed image according to a sequence. The scenario definition file may designate the number identifying the layer in the hierarchical data used in rendering the image along with the frame definition parameters.

Described below is an example of the scenario definition file 119 written in XML.

```
(1)     <?xml version="1.0" encoding="utf-8"?>
(2)     <Viewer>
(3)     <FileList>
(4)             <File name="INDEX"/>
(5)             <File name="hyoshi"/>
(6)             <File name="ichiran"/>
(7)     </FileList>
(8)     <InitCameraPosition x="-0.219" y="0.32" scale="0.28"/>
(9)             <Section>
(10)                    <Event type="change" name="INDEX" wait="0.0">
(11)                            <CameraPosition x="-0.219" y="0.32" scale="0.28"/>
(12)                    </Event>
(13)            </Section>
(14)            <Section>
(15)                    <Event type="camera" name="camera1" wait="0.0">
(16)                            <Interpolator
(17)                                    duration='4.0'
(18)                                    type='linear'
(19)                                    key='0 0.5 1.0'
(20)                                    keyValue='
(21)                                                    -0.219 0.32 0.28
(22)                                                    -0.115955 0.29424 0.2
(23)                                                    -0.115955 0.29424 0.155553
(24)                                                    '/>
(25)                    </Event>
(26)            </Section>
(27)            <Section>
(28)                    <Event type="change" name="hyoshi" wait="0.0">
(29)                            <CameraPosition x="0.01257207987839" y="-0.00214762229374" scale="0.94793879664622"/>
(30)                    </Event>
(31)            </Section>
(32)            <Section>
(33)                    <Event type="change" name="09france-ichiran" wait="2.0">
(34)                            <CameraPosition x="-0.007705" y="-0.008650" scale="0.508980"/>
(35)                            <VideoPosition name="video:sample.m2v" x="0.135605" y="-0.035605" scale="0.061268"/>
(36)                            <Effect type="fade0"/>
(37)                    </Event>
(38)            </Section>
(39)            <Section>
(40)                    <Event type="image" name="tbs01.png" wait="0.0">
(41)                            <Position x="0.971875" y="-0.95" alpha="0.0" layer="1003" cardinal="rightbottom"/>
(42)                    </Event>
(43)            </Section>
```

| | |
|---|---|
| (44) | </Story> |
| (45) | </Viewer> |

In the above description, (3)-(7) designate hierarchical data used in the content. (8) designate the initial position of the image. (9)-(13) designate the image of the hierarchical data displayed as an index as being the image that should be used initially, and the display area thereof. (14)-(31) designate data shifting by zooming to the image of the hierarchical data for the front cover of a book using camera animation. Of these lines, (14)-(26) designate camera animation by describing key frames. (27)-(31) designate the image of the hierarchical data displayed and the display area thereof. A link is established using the display area. (32)-(38) designate switching to the image of the hierarchical data including a link to moving images and that the moving images are displayed on an enlarged scale. Of these lines, (32)-(35) designate a link to the moving image in the same way as a link to the hierarchical data. (36) designates an effect applied used for rendering when the screen is switched. (39)-(43) designate displaying a copyright notice of the moving images while the moving images are being displayed. Of these lines, (40)-(41) designate displaying an ordinary image not having a hierarchical structure.

The embodiment facilitates various image representations using a plurality of sets of hierarchical data as sources, by creating the link definition file or the scenario definition file. Therefore, an ordinary user may use hierarchical data provided as content over the network or in a recording medium to create unique content. The content created in this way may be distributed.

Figure 22:
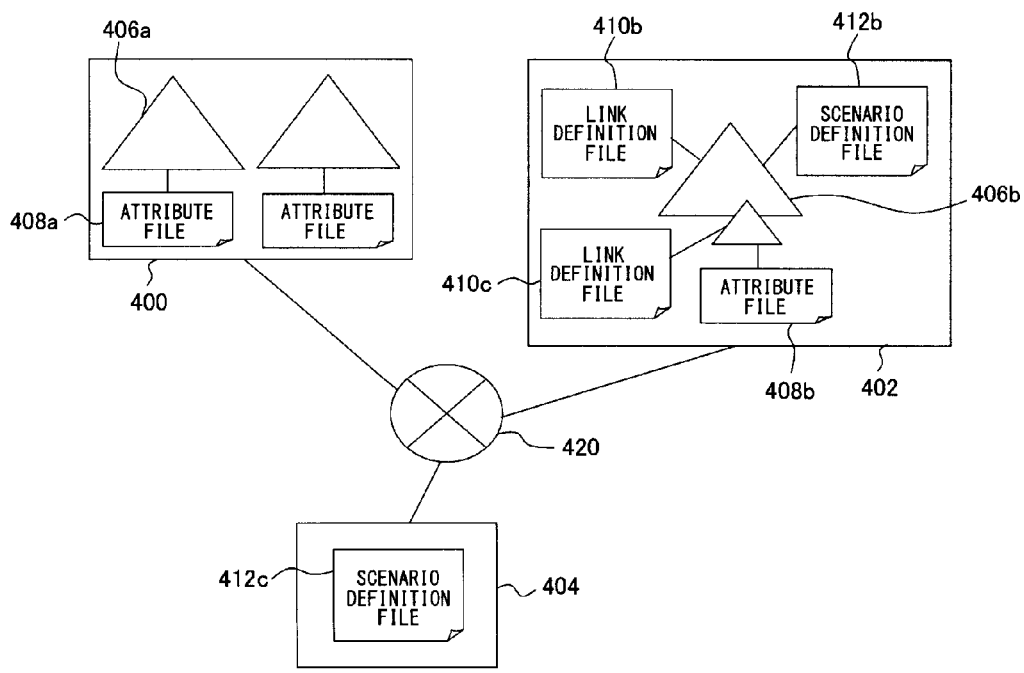
FIG. 22 schematically shows an example of a mode of distributing data to implement the embodiment.

FIG. 22 schematically shows an example of a mode of distributing data to implement the embodiment. In this example, servers 400, 402, and 404 are connected via the network 420. The server may be that of a content creator or, alternatively, an information terminal of an ordinary user. Still alternatively, a recording medium such as a CD-ROM or DVD may be used in place of a server. The server 400 provides a content comprising hierarchical data 406a and an attribute file 408a attached to the hierarchical data. A description on the attribute file 408a will be given later. The server 402 provides a content comprising hierarchical data 406b formed of a plurality of sets of hierarchical data, link definition files 410b, 410c that define information on a link between the hierarchical data sets, a scenario definition file 412b, and an attribute file 408b.

When a link is defined in the hierarchical data 406b, the link definition files 410b and 410c are attached to the individual hierarchical data sets, as described above. Meanwhile, a scenario definition file takes advantage of the link thus set up and is capable of establish setting across hierarchical data. Therefore, the scenario definition file is attached to the whole set of hierarchical data in which links are established.

The server 404 only provides the scenario definition file 412c. The data structure as illustrated is by way of example only. A scenario definition file may be attached to a single set of hierarchical data in which no links are established. Conversely, a link definition file may be attached without a scenario definition file being attached. The contents stored in the server 400 and the server 402 can be displayed on a stand-alone basis. On the other hand, a set of content can be created by obtaining the scenario definition file 412c and the hierarchical data 406a and 406b designated in the file, if the sets of hierarchical data are included in the setting defined in the scenario definition file 412c in the server 404. Therefore, any of the data structures shown in FIG. 22 can be a unit of distribution as content.

In consideration of such possibilities, an attribute file is attached to the hierarchical data. Information recorded in the attribute file includes information related to the content (e.g., basic information such as the title of the content, creator, publisher, sponsor, date of creation, version, and language used; information on the owner of a right to the content or source material; information on refunding of the charge; information on the control of secondary use; information on ownership or copyright such as the expiration date, the number of times that copying is allowed, and the number of times that the possession of the content can be transferred; and rating).

Additionally, control attributes of the content (e.g., authentication control information such as permission for connection or for use of data, encryption scheme, and signature; information related to billing such as information as to whether pay-as-you-go charge plan is in effect, information as to whether an upper limit is defined for the use of the content, information as to whether the content is made available free of charge, designation of currency or virtual currency, and information on payment method selected from charge, withdrawal, check, etc.; operating environment such as platform, OS, and recommended resources; and access control information such as target users, and areas or countries of valid use) may be attached. Further, data structure information may be attached to the attribute file. For example, the attached data structure information may include information on the content structure including the area for the attribute information, the area for the hierarchical data, and external reference link information; thumbnail information defining a name of content, a representative image, billing guidance, summary of attributes; and information on a location storing frame information.

By attaching the attributes information to the individual hierarchical data, it is ensured that appropriate measures are taken when a content comprising a plurality of sets of hierarchical data using the hierarchical data with the attributes as a destination of a link is created and displayed. For example, attaching the attributes enables copyright notice to be displayed when a transition to a content protected by a copyright as a destination of a link occurs and enables a dialog for authentication to be displayed for a content configured such that authentication is necessary. Whether to display or not display the content may be determined according to the rating and a viewer profile. If the display is disabled, the image is not displayed. If the display is disabled, transition to the destination of the link does not take place even if the displayed image is within the link area so that only the image from the initial hierarchical data may is enlarged or reduced. Processes according to attribute information can be implemented using the same configuration used in the process of displaying an ordinary content.

The plurality of hierarchical data in which a link is defined form a single content as a whole so that the attribute file is attached not only to the individual hierarchical data but also the entirety of the plurality of sets of hierarchical data.

Figure 23:
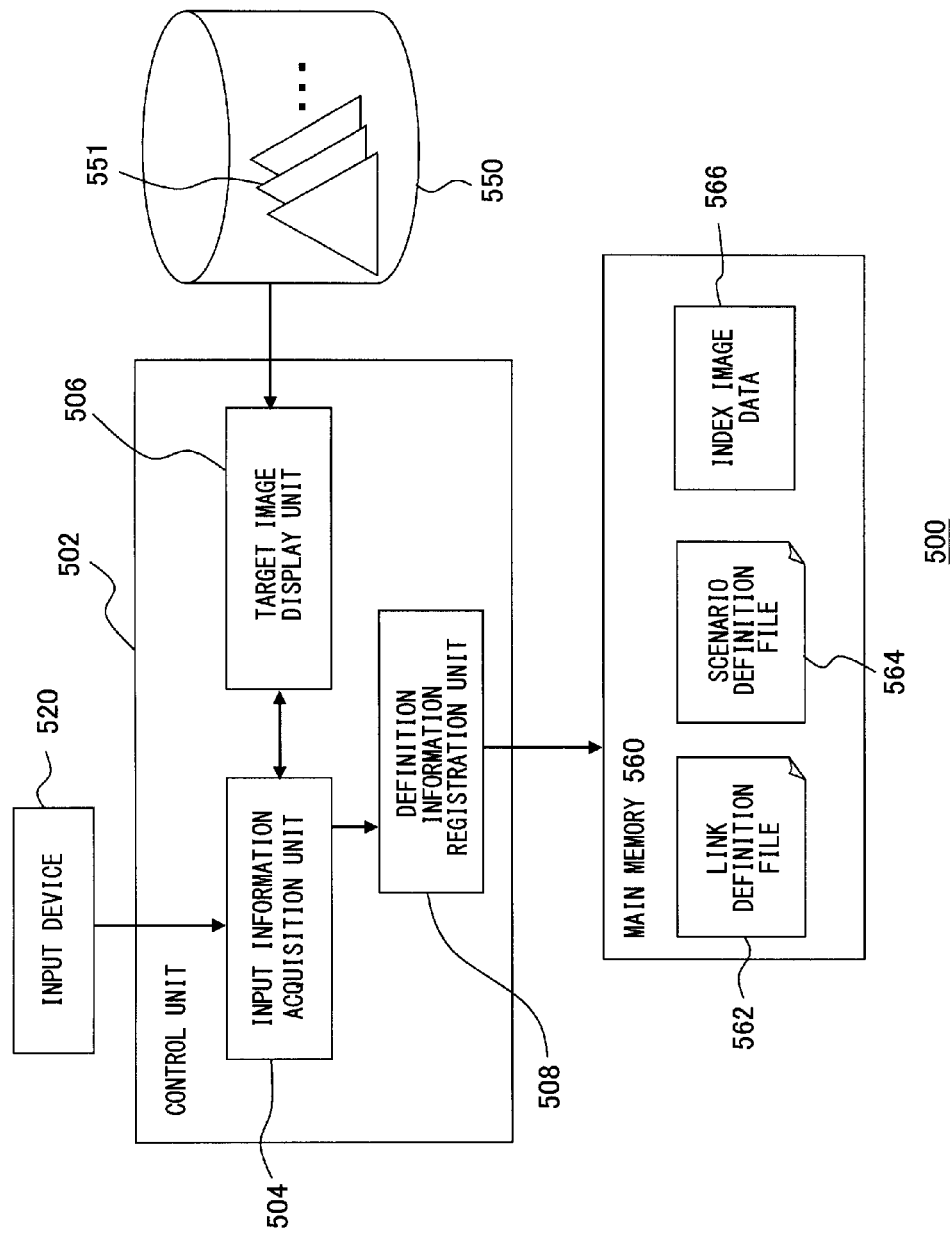
FIG. 23 shows the configuration of an image processing device provided with the function of assisting content creation according to the embodiment.

A description will now be given of a technology for assisting the user to create a content such as that described above in the embodiment that uses hierarchical data. FIG. 23 shows the configuration of an image processing device provided with the function of assisting content creation according to the embodiment. An image processing device 500 shown in the figure may further have the same configuration as the image processing device 10 shown in FIG. 4. FIG. 23 depicts only those functional blocks provided to implement the embodiment. Therefore, a control unit 502 of FIG. 23 may be implemented by the same processor as the control unit 100 shown in FIG. 9. Alternatively, the control unit 502 may be implemented as a separate device.

The image processing device 500 is provided with one or a combination of the following functions.
1. Acknowledge the definition of a guidance area, and create and update a scenario definition file.
2. Acknowledge the definition of a link area, and create and update a link definition file.
3. Acknowledge selection of a plurality of images and create an index image that allows selection from the images, by defining a link between the images.

The image processing device 500 is provided with an input device 520, a control unit 502, a hard disk drive 550, and a main memory 560. The hard disk drive 550 stores existing hierarchical data sets 551. A link may be established between hierarchical data sets. The input device 520 is an interface that allows the user to enter selection of the above-mentioned functions, selection of an image area, and various setting. For example, the input device 520 may have the appearance shown in FIG. 2. The control unit 502 comprises an input information acquisition unit 504, a target image display unit 506, and a definition information registration unit 508. The input information acquisition unit 504 acquires information entered by the user using the input device 520 and requests the target image display unit 506 and the definition information registration unit 508 to perform a process as appropriate.

When the user provides an input requesting a guidance area or a link area to be defined, the target image display unit 506 reads the hierarchical data for the image selected by the user from the hard disk drive 550 and displays. The target image display unit 506 moves the displayed image in accordance with a user request to move the screen, or display a rectangle for designating an area in accordance with positional information of a pointer. When the user designates an area in an image to set a link area or a guidance area, the definition information registration unit 508 acquires the frame definition parameters of the area, generates a link definition file 562 or a scenario definition file 564, and stores the generated files in the main memory 560.

When the user selects a plurality of images, the definition information registration unit 508 selects the resolution of the images as appropriate, creates hierarchical index image data 566 showing an arrangement of the images in a predetermined format, and stores the index image data in the main memory 560. A link definition file 562 in which links are defined between the generated hierarchical index image data and the hierarchical data for the individual images included in the index (hereinafter, referred to as "individual image") is created at the same time and stored in the main memory 560. As mentioned above, the link definition file 562, the scenario definition file 564, and the index image data 566 may not only be stored in the main memory 560 and used for display but also stored in the hard disk drive 550 or another recording medium. In this process, the files 562 and 564, the data 566, and the hierarchical data subject to the definition are grouped to form a single content.

Figure 24:
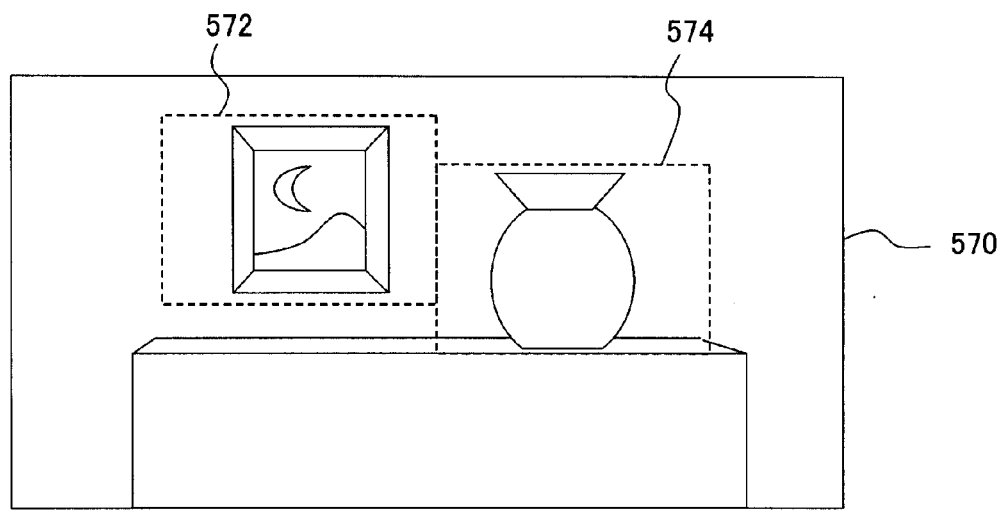
FIG. 24 illustrates steps of the process of acknowledging the definition of a guidance area, and creating and updating a scenario definition file according to the embodiment.

FIG. 24 illustrates steps of the process, noted in "1" above, of acknowledging the definition of a guidance area, and creating and updating a scenario definition file. The user selects the hierarchical data for the target image using the input device 520. The target image display unit 506 obtaining the information from the input information acquisition unit 504 reads the hierarchical data from the hard disk drive 550 and displays the data accordingly. An image 570 of FIG. 24 shows the entirety of the selected image. The user uses the input device 520 to provide a request to move the image while viewing the display by the target image display unit 506. The user presses a predetermined definition button after displaying an area 572, which the user desires to define as a guidance area, in a full-screen size. Instead of the process described above, a rectangular surrounding the area may be rendered using a pointer operation, prompting the user to press the definition button.

In response, the definition information registration unit 508 acquires the frame definition parameters of the area and records the parameters in the scenario definition file 564. The user selects another area 574 as needed and presses the definition button. In response, the definition information registration unit 508 adds the frame definition parameters of the selected area in the subsequent line in the scenario definition file 564. By repeating the above steps, all desired areas are recorded in the scenario definition file 564. Using the scenario definition file 564 thus generated, the areas desired to be displayed are sequentially displayed at a desired resolution in the order of areas 572, 574, . . . , as described above.

A markup language that describes the process of controlling display (e.g., display time of each area, animation process for interpolating between the images, and effect process) may be generated. A variation of image processing using sample images may be presented, prompting the user to select a desired process. The selected process is recorded in the scenario definition file 564 along with the frame definition parameters of the guidance area.

Figure 25:
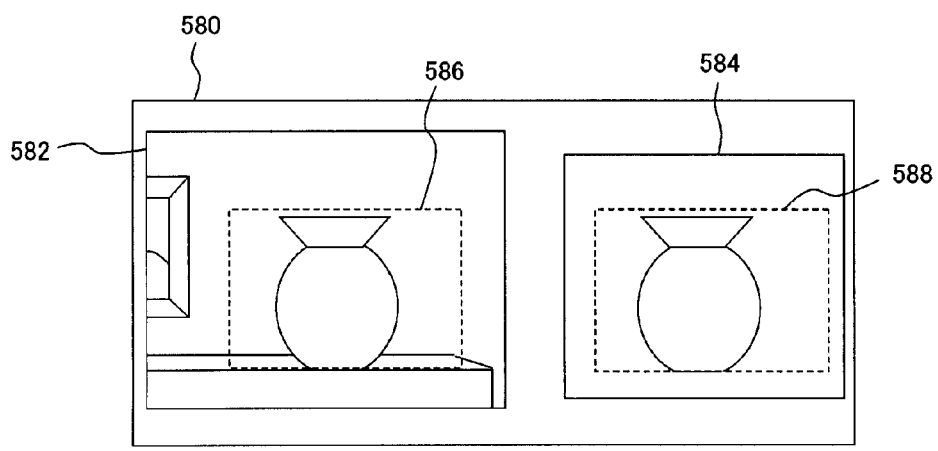
FIG. 25 illustrates steps of the process of acknowledging the definition of a link area, and creating and updating a link definition file according to the embodiment.

FIG. 25 illustrates steps of the process, noted in "2" above, of acknowledging the definition of a link area, and creating and updating a link definition file. The user selects two sets of hierarchical data for two images which are the targets to be linked, using the input device 520. The target image display unit 506 obtaining information from the input information acquisition unit 504 reads the hierarchical data from the hard disk drive 550 and displays the data using two screens. Images 582 and 584 of FIG. 25 show selected images. The user uses the input device 520 to provide a request to move the image 582 while viewing the display by the target image display unit 506 and causes an image including the area 586 desired to be defined as a link area to be displayed. The user then causes a rectangular surrounding the area to be rendered using a pointer operation so as to select the area. Similarly, an area 588 in the image 584 is selected. When the selection is completed, the user presses a predetermined definition button.

In response, the definition information registration unit 508 acquires the frame definition parameters of the areas 586 and 588, and records the parameters in the link definition file 562 in the form of the data structure as shown in FIG. 14. For example, the definition information registration unit 508 may collect information that should be designated in the effective scale range 304 and the link destination file field 306 by establishing a rule to display the link source image and the link destination image respectively on the left side and the right side of the target image display unit 506, and by allowing the user to select whether the link defines transition to enlarge the image or reduce the image. The link definition file 562 thus generated defines a link between the image 582 and the image 584. By zooming to the area 586 as described above, transition to the hierarchical data for the image 584 occurs for display of the image, allowing a magnified view of the image.

The description above concerns defining a link between images. The destination of the link is not limited to an image and may be data for moving images, applications, audio, music, text, etc. In this case, the link source image may be displayed like the image 582. An icon representing data that represents a candidate of the destination of the link may be displayed in place of the image 584, allowing selection by the user. As described above, the link destination file field 306 in the link definition file 562 records the file name of the data corresponding to the selected icon. The link destination image frame field 308 may be invalidated.

When the areas 586 and 588 are selected by the user, the frame definition parameters may be fine-adjusted in the virtual space so that the objects as shown in the two images are completely aligned, by extracting hint points in the objects displayed in each area and computing a matching score. This prevents displacement between the objects as shown from occurring due to the link during transition between the images and prevents the switching process from being visibly known. The process is useful not only in the case that the objects in the two images are identical but also in the case where two images are blended by cross fading (e.g., where a given object goes through a process of change). FIG. 25 shows selecting one area from each of the two images and defines a link accordingly. Alternatively, three or more images may be subject to selection, or a plurality of link areas may be defined in a single image. The aforementioned steps are repeated to achieve such a case.

If any attribute information is attached to the hierarchical data in which a link is established, a dialog may be displayed that allows the user to enter information as to which of the information should be displayed and where the information should be displayed. The information entered by the user is recorded in the link definition file 562 and may be displayed as appropriate in the event of transition to the displayed image at the destination of the link.

Figure 26:
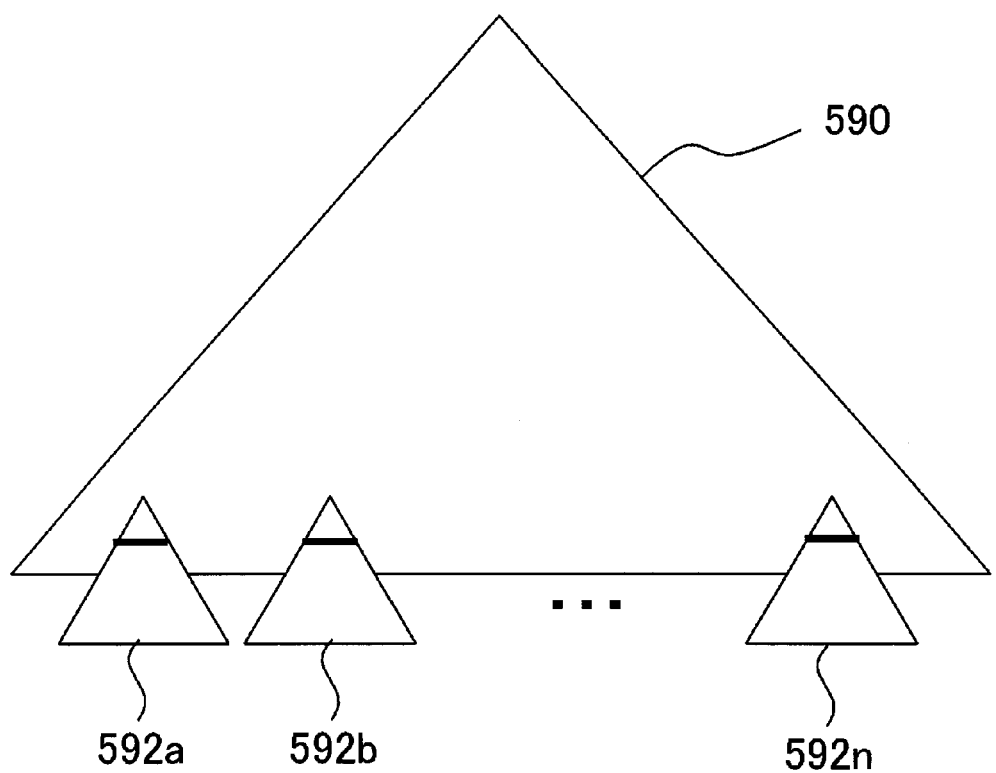
FIG. 26 illustrates the process of acknowledging selection of a plurality of images and creating an index image that allows selection from the images such that a link is defined between the images.

FIG. 26 illustrates the process, noted in "3" above, of acknowledging selection of a plurality of images and creating an index image that allows selection from the images by defining a link between the images. The user uses the input device 520 to select hierarchical data for a plurality of individual images for which an index is desired. In response, the definition information registration unit 508 generates an index image in which individual images with appropriate resolutions (e.g., lowest-resolution images in the selected hierarchical data) are embedded as indices, such as the image 350 as shown in FIG. 18 as the index image data 566, and stores the data 566 in the main memory 560. Referring to FIG. 18, areas 352*a*, 352*b*, and 352*c* represent individual images selected by the user.

Hierarchical data 590 may be existent data selected by the user. For example, by selecting an image of the wall of an art museum as the hierarchical data 590 and arranging individual images within the frames on the wall, an image showing the individual images on the wall of the art museum is generated. Information as to where in the index image the individual images are arranged, the size of the images, etc. may be acknowledged from the user. In this case, the definition information registration unit 508 may generate index image data in which the individual images of sizes designated by the user are embedded at the positions designated by the user.

The definition information registration unit 508 further generates a link definition file 562 in which links to the hierarchical data 592*a*, 592*b*, . . . , 592*n* are defied at the positions in the hierarchical data 590 for the index image where the individual images are embedded, and stores the file 562 in the main memory 560. By using the index image data 566 and the link definition file 562 thus generated when zooming to an individual image in the index image, transition to, for example, the hierarchical data 592*a* for the individual image occurs for display of the image, allowing a magnified view of the image or playback of moving images. The index image data 566, the link definition file 562, and the hierarchical data for the individual images may be grouped to form a single content and stored in the hard disk drive 550.

Links may not be defined between the hierarchical data for the individual image (e.g., the hierarchical data 592*a*) and the hierarchical data 590 for the index image. Instead, the hierarchical data for the index image may be generated to contain all the hierarchical data for the individual images. Alternatively, an index image may be generated in which a plurality of existing index images are embedded. The process in this case can be achieved by allowing selection of an index image instead of an individual image.

According to this embodiment as described above, a link is defined between the hierarchical data sets for two images to allow transition between the hierarchical data sets for rendering of the displayed image only by entering a request to translate, enlarge, or reduce the image. This eliminates the need for maintaining extra data (e.g., high-resolution image of an area that would be meaningless if enlarged) and so reduces the data size. By maintaining images with considerably different scales (e.g., a world map and a map around a building) in separate hierarchical data, numerical values for controlling the position of the displayed image can be redefined in the respective hierarchies so that the precision of position can be maintained easily.

Meanwhile, when a link is defined in completely different images (e.g., between a menu image and a manual for an icon in the menu), transition between images can be achieved only by an operation to enlarge or reduce the image. Therefore, the user can view a different image with the knowledge of the positional information in the pre-switching image. For example, in the related-art approach wherein the user displays a help screen to study the function of an icon, searches for a description likely to be related to the display of the icon, and reads the description, the steps that should be done, including the display of the icon and the display of the description in the help, are complicated so that the user is likely to feel that his or her thinking is interrupted. As a result, the user may lose track of the initially intended goal. However, according to the embodiment, the icon and the manual are directly connected so that intuitive understanding is possible and working efficiency is improved.

User operations like enlargement, reduction, translation, etc. occurring in the future can be predicted. The embodiment makes prediction and decodes the image at the destination of the link in advance. This allows the image at the destination of the link to be rendered smoothly when the user actually requests switching of the image, and reduces wait time required for a decoding process. This is useful to start playing back moving images at the destination of the link or to activate an application. In other words, by playing back moving images or activating an application in advance through a prefetch process, output can be made smoothly when the user actually requests transition to the destination of the link. In comparison with the related-art method for activation initiated by clicking an icon, the inventive approach reduces latency for a process remarkably and reduces user's stress.

By using convolution to provide a delay time between the user input of a signal requesting to move the displayed image and the display of the image, or by applying an appropriate a visual effect process (e.g., cross fade) when the image is switched, the inventive system can make it appear that the image is switched smoothly. As a result, a novel input tool is provided that utilizes an operation of moving the displayed image to display other still images or moving images. The inventive tool is not only capable of displaying images but also playing back music or showing text data.

A link is defined by defining a link area in the link source hierarchical data and the link destination hierarchical data in the virtual space. Therefore, a link structure that is apparently complex can be easily defined so that ordinary users can create content with ease. By storing several areas in the hierarchical data using the definition, the displayed image can be guided to the areas. For example, a link area may be defined such that the displayed image is guided to the defined link area only by roughly aligning the displayed image with the link area so that switching to the image at the destination of the link can take place in a short period of time. By creating a scenario definition file that records a plurality of portions in the image desired to be viewed, the defined portions can be successively presented for view, allowing effective content such as promotion or presentation to be produced. Alternatively, the inventive system allows moving to the next area in an article in a multiple column format or a magazine page designed to be viewed in a predefined order such that magnification of a level that allows characters to be legible is maintained.

The hierarchical data in which a link is thus defined or the hierarchical data in which a guidance area is thus defined by a scenario definition file can be distributed as a package. Meanwhile, modules such as the hierarchical data or the scenario definition file can be distributed on a stand-alone basis. Attribute information such as information related to the content, information related to control, information on data structure, or the like is appended to each hierarchical data or content. In the case that the content includes hierarchical data or a content originated by another author, the aforementioned approach allows billing or imposing restriction on the transition to the destination of the link. Further, by defining an attribute information format that is uniform across content modules, a secondary content utilizing the attribute information can be created efficiently.

Screen views of the link area and guidance area are presented for selection in order to assist content creation so as to create a link definition file or a scenario definition file in a predetermined format. With this, the user can easily define a link area or a guidance area while viewing an actual image and elaborate on the image. In defining a link area, the positions of the link areas in the two mages are fine-adjusted by extracting hint points and computing a matching score. This prevents misalignment from occurring when the image is switched and allows continuous transition, reducing the likelihood that the viewer notices the switching of the image.

An index image in which a plurality of individual images selected by the user are embedded is generated. A link definition file defining a link between the index image and the individual images is generated. This facilitates creation of various contents simply by selecting images. For example, the user can create a content that allows the user to select a desired magazine back number from a view of the content of the back numbers, a content provided with a menu screen from which various applications or moving images can be started, a content that switchably shows pictures, novels, portraits, etc. and associated commentary.

Described above is an explanation based on an exemplary embodiment. The embodiment is intended to be illustrative only and it will be obvious to those skilled in the art that various modifications to constituting elements and processes could be developed and that such modifications are also within the scope of the present invention.

DESCRIPTION OF THE REFERENCE NUMERALS

1 image processing system, 10 image processing device, 12 display device, 20 input device, 30 0-th layer, 32 first layer, 34 second layer, 36 third layer, 38 tile image, 44 display processing unit, 50 hard disk drive, 60 main memory, 70 buffer memory, 90 frame memory, 100 control unit, 102 input information acquisition unit, 104 compressed data division unit, 106 load block determination unit, 108 loading unit, 110 prefetch processing unit, 112 decoding unit, 114 displayed image processing unit, 116 link determination unit, 117 scenario interpretation unit, 118 link definition file, 119 scenario definition file, 408a attribute file, 500 image processing device, 502 control unit, 504 input information acquisition unit, 506 target image display unit, 508 definition information registration unit, 520 input device, 550 hard disk drive, 560 main memory, 562 link definition file, 564 scenario definition file, 566 index image data As described above, the present invention is applicable to information processing devices such as computers, game devices, and image display devices.

The invention claimed is:

1. An image processing device adapted to display at least part of two-dimensional (2D) image on a display, comprising:
   a storage device configured to store hierarchical data comprising image data that are representations of the 2D image in different resolutions and that are hierarchized in order of resolution;
   a memory configured to store a scenario definition file having a designated area in the hierarchical data in a virtual space defined by an image plane of the 2D image and an axis of resolution, the designated area defining a specific region in the 2D image and a resolution;
   an input information acquisition unit configured to acknowledge a user request related to a change in a displayed part of the 2D image, the user request being a directive to move the displayed part of the 2D image to a user-defined portion of the 2D image via movement of the displayed part of the 2D image at least one of upward, downward, leftward, rightward, inward and outward irrespective of the user's physical, geographic position; and
   a displayed image processing unit configured to move the displayed part of the 2D image automatically to the designated area of the scenario definition file, instead of the user-defined portion of the 2D image of the user request, when the user request indicates a change of the displayed part of the 2D image to the user-defined portion of the 2D image that is within a predetermined range from the designated area, and the displayed image processing unit operating to move the displayed part of the 2D image to the designated area in the virtual space instead of the user-defined portion of the 2D image of the user request.

2. The image processing device according to claim 1, wherein the designated area in the hierarchical data of the scenario definition file is a rectangle having a predetermined aspect ratio at a resolution in the virtual space.

3. The image processing device according to claim 1, wherein the scenario definition file includes a plurality of such designated areas at a resolution in the virtual space.

4. The image processing device according to claim 1, wherein the scenario definition file includes a plurality of such designated areas at a plurality of resolutions in the virtual space.

5. The image processing device according to claim 1, wherein:
the memory further stores a link definition file that maps an area of a 2D image consisting of a hierarchical data to an area of another 2D image consisting of another hierarchical data, the areas being defined in virtual spaces different from each other,
the scenario definition file having a designated area which is mapped to an area of another 2D image by the link definition file, and
when the displayed part of the 2D image enters into a predetermined range from the designated area in the virtual space of the hierarchical data currently being displayed and that is designated in the link definition file, the displayed image is switched to a mapped area of another 2D image.

6. The image processing device according to claim 1, wherein:
the scenario definition file further defines the order of display of a plurality of such designated areas, and
when the input information acquisition unit acknowledges a user request to start a continuous movement of displayed part, the displayed image processing unit refers to the scenario definition file and continuously moves the displayed part of the 2D image with passing through the plurality of designated areas in the defined order.

7. The image processing device according to claim 1, wherein:
the input information acquisition unit further acknowledges a user request to register a part of the 2D image currently being displayed in the scenario definition file, and
the image processing device further comprises a definition information registration unit configured to register the part as the designated area in the scenario definition file.

8. An image processing method adapted to display at least part of a two-dimensional (2D) image on a display, comprising:
storing hierarchical data comprising image data that are representations of the 2D image in different resolutions and that are hierarchized in order of resolution;
storing a scenario definition file having a designated area in the hierarchical data in a virtual space defined by an image plane of the 2D image and an axis of resolution, the designated area defining a specific region in the 2D image and a resolution;
reading the 2D image data from a storage device and rendering an image on a display device;
acknowledging a user request to move a displayed part of the 2D image, the user request being a directive to move the displayed part of the 2D image to a user-defined portion of the 2D image via movement of the displayed part of the 2D image at least one of upward, downward, leftward, rightward, inward and outward irrespective of the user's physical, geographic position; and
moving the displayed part of the 2D image automatically to the designated area of the scenario definition file, instead of the user-defined portion of the 2D image of the user request, when the user request indicates a change of the displayed part of the 2D image to the user-defined portion of the 2D image that is within a predetermined range from the designated area such that the displayed part of the 2D image is moved to the designated area in the virtual space instead of the user-defined portion of the 2D image of the user request.

9. A non-transitory computer-readable recording medium having embodied thereon a computer program adapted to cause a computer to implement a function of displaying at least part of a two-dimensional (2D) image on a display, the computer program comprising:
a module configured to store hierarchical data comprising image data that are representations of the 2D image in different resolutions and that are hierarchized in order of resolution;
a module configured to store a scenario definition file having a designated area in the hierarchical data in a virtual space defined by an image plane of the 2D image and an axis of resolution, the designated area defining a specific region in the 2D image and a resolution;
a module configured to read the 2D image data from a storage device and render an image on a display device;
a module configured to acknowledge a user request to move a displayed part of the 2D image, the user request being a directive to move the displayed part of the 2D image to a user-defined portion of the 2D image via movement of the displayed part of the 2D image at least one of upward, downward, leftward, rightward, inward and outward irrespective of the user's physical, geographic position; and
a module configured to move the displayed part of the 2D image automatically to the designated area of the scenario definition file, instead of the user-defined portion of the 2D image of the user request, when the user request indicates a change of the displayed part of the 2D image to the user-defined portion of the 2D image that is within a predetermined range from the designated area such that the displayed part of the 2D image is moved to the designated area in the virtual space instead of the user-defined portion of the 2D image of the user request.

10. An image processing device adapted to display at least part of a two-dimensional (2D) image on a display, comprising:
a storage device configured to store hierarchical data comprising image data that are representations of the 2D image in different resolutions and that are hierarchized in order of resolution;
a memory configured to store a link definition file mapping an area of a 2D image consisting of a hierarchical data to an area of another 2D image consisting of another hierarchical data, the areas being respectively defined in virtual spaces defined by image plane of respective 2D images and an axis of resolution and different from each other;
an input information acquisition unit configured to acknowledge a user request for movement of a displayed part of the 2D image, the user request being a directive to move the displayed part of the 2D image to a user-defined portion of the 2D image via movement of the displayed part of the 2D image at least one of upward, downward, leftward, rightward, inward and outward irrespective of the user's physical, geographic position, and
a displayed image processing unit configured to switch the displayed image to a mapped area of the another 2D image, instead of the user-defined portion of the 2D image of the user request, when the user request indicates a change of the displayed part of the 2D image to the user-defined portion of the 2D image that is within a predetermined range from a designated area defined in the link definition file such that the displayed part of the 2D image is moved to the mapped area of the another 2D image in the virtual space instead of the user-defined portion of the 2D image of the user request.

11. The image processing device according to claim 10, wherein the designated area in the hierarchical data of in the link definition file is a rectangle having a predetermined aspect ratio at a resolution in the virtual space.

12. The image processing device according to claim 10, wherein:
the link definition file records, for each pair of mapped areas, whether to validate the switching of the displayed image depending on whether the initial displayed 2D image is enlarged or reduced, and
the displayed image processing unit switches the displayed image when the switching of the displayed image is determined to be valid.

13. The image processing device according to claim 10, further comprising:
a prefetch processing unit configured to predict a subsequent movement of the displayed part of the 2D image, based on the user request for movement of the displayed-part acknowledged by the input information acquisition unit,
wherein, when it is predicted by the prefetch processing unit that the displayed part enters into a predetermined range, in the virtual space of the hierarchical data currently being displayed, from the designated area in the link definition file, the displayed image processing unit starts decoding data of the mapped area of another 2D image.

14. The image processing device according to claim 10, wherein the hierarchical data is stored in the storage device in a unit of image block produced by dividing the hierarchical data according to a predefined rule,
the image processing device further comprising a loading unit configured to load an image block located in the hierarchical data currently being displayed and including a point at a predetermined distance from the displayed part in the virtual space, into the memory from the storage device,
wherein, when the point is located within a predetermined range, in the virtual space of the hierarchical data currently being displayed, from a designated area in the link definition file, the loading unit converts the coordinates of the point into the coordinates defined in a virtual space of another hierarchical data including the mapped area, and loads the image block of the another hierarchical data.

15. The image processing device according to claim 10, wherein the link definition file designates a moving image to which an area is mapped.

16. The image processing device according to claim 10, wherein:
attribute information for controlling the use of the hierarchical data is attached to the hierarchical data stored in the storage device, and
the displayed image processing unit reads the attribute information of the target hierarchical data when switching the displayed image and changes the mode of display based on the information and according to a predetermined rule.

17. An image processing method adapted to display at least part of a two-dimensional (2D) image on a display, comprising:
reading the 2D image data from a storage device and rendering an image on a display device;
acknowledging a user request to move a displayed-part of the 2D image, which could be a request to move, enlarge, or reduce a display part of the 2D image currently being displayed, the user request being a directive to move the displayed part of the 2D image to a user-defined portion of the 2D image via movement of the displayed part of the 2D image at least one of upward, downward, leftward, rightward, inward and outward irrespective of the user's physical, geographic position; and
switching the display to a predetermined area of another 2D image, instead of the user-defined portion of the 2D image of the user request, when the user request indicates a change of the displayed part of the 2D image to the user-defined portion of the 2D image that is within a predetermined area and resolution predefined in the memory such that the displayed part of the 2D image is moved to the predetermined area of the another 2D image in the virtual space instead of the user-defined portion of the 2D image of the user request.

18. The image processing method according to claim 17, wherein the predetermined area of another 2D image includes a moving image.

19. A non-transitory computer-readable recording medium having embedded thereon a computer program adapted to cause a computer to implement a function of displaying at least part of a two-dimensional (2D) image on a display, the computer program comprising:
a module configured to read the 2D image data from a storage device and rendering an image on a display device;
a module configured to acknowledge a user request to move a displayed part of the 2D image, which could be a request to move, enlarge, or reduce a display part of the 2D image currently being displayed, the user request being a directive to move the displayed part of the 2D image to a user-defined portion of the 2D image via movement of the displayed part of the 2D image at least one of upward, downward, leftward, rightward, inward and outward irrespective of the user's physical, geographic position; and
a module configured to switch the display to a predetermined area of another 2D image, instead of the user-defined portion of the 2D image of the user request, when the user request indicates a change of the displayed part of the 2D image to the user-defined portion of the 2D image that is within a predetermined area and resolution predefined in the memory such that the displayed part of the 2D image is moved to the predetermined area of the another 2D image in the virtual space instead of the user-defined portion of the 2D image of the user request.

20. A non-transitory computer-readable recording medium having embedded thereon a data structure for content adapted to map the following to each other:
a link definition file mapping an area of a two-dimensional (2D) image including a hierarchical data, comprising image data that are representations of the 2D image in different resolutions and that are hierarchized in order of resolution, to an area of another 2D image consisting of another hierarchical data, the areas being respectively defined in virtual spaces defined by image plane of respective 2D images and an axis of resolution, and being used for switching a display image between 2D images;
the plurality of sets of hierarchical data mapped in the link definition file; and attribute information for controlling the use of the hierarchical data, wherein:

when an input information acquisition unit acknowledges a user request for movement of a displayed part of the 2D image, the user request being a directive to move the displayed part of the 2D image to a user-defined portion of the 2D image via movement of the displayed part of the 2D image at least one of upward, downward, leftward, rightward, inward and outward irrespective of the user's physical, geographic position, and when a displayed image processing unit switches the displayed image to a mapped area of the another 2D image, instead of the user-defined portion of the 2D image of the user request, the user request must indicate a change of the displayed part of the 2D image to the user-defined portion of the 2D image that is within a predetermined range from a designated area defined in the link definition file such that the displayed part of the 2D image is moved to the mapped area of the another 2D image in the virtual space instead of the user-defined portion of the 2D image of the user request.

21. An image processing device adapted to display at least part of a two-dimensional (2D) image on a display, comprising:

a storage device configured to store hierarchical data comprising image data that are representations of the 2D image in different resolutions and that are hierarchized in order of resolution;

a memory configured to store a link definition file mapping an area of a 2D image consisting of a hierarchical data to an area of another 2D image consisting of another hierarchical data and defining a condition of switching the displayed image between the area of the 2D image to the area of another 2D image;

an input information acquisition unit configured to acknowledge a user request for movement of a displayed part of the 2D image, the user request being a directive to move the displayed part of the 2D image to a user-defined portion of the 2D image via movement of the displayed part of the 2D image at least one of upward, downward, leftward, rightward, inward and outward irrespective of the user's physical, geographic position;

a link determination unit configured to determine, while an 2D image is being displayed, whether the displayed part of the 2D image meets the condition for switching, by referring to the user request and the link definition file, the condition being when the user request indicates a change of the displayed part of the 2D image to the user-defined portion of the 2D image that is within a predetermined range from a designated area defined in the link definition file; and a displayed image processing unit configured to switch the displayed image to an area of the another 2D image mapped to the part of the 2D image currently being displayed, when the link determination unit determines that the condition for switching is met, such that the displayed part of the 2D image is moved to the area of the another 2D image in the virtual space instead of the user-defined portion of the 2D image of the user request.

22. The image processing device according to claim 21, further comprising:

an input information acquisition unit configured to acknowledge a user request to move a displayed part of the 2D image, which could be a request to move, enlarge, or reduce a display part of the 2D image currently being displayed, wherein the link determination unit determines, when the request for movement is originated, whether the displayed part of the 2D image meets the condition for switching as a result of the request for movement.

23. The image processing device according to claim 22, wherein the link definition file defines a state where the displayed part reaches a predetermined area in the 2D image and a resolution as the condition for the switching of the displayed image.

24. The image processing device according to claim 22, further comprising:

a prefetch processing unit configured to predict a subsequent movement of the displayed part of the 2D image, based on the user request for movement of the displayed part acknowledged by the input information acquisition unit; and a decoding unit configured to start to decode, when the 2D image currently being displayed is mapped to a moving image in the link definition file, the moving image data, when the prefetch processing unit predict that the displayed part of the 2D image meets the condition for switching.

25. The image processing device according to claim 21, wherein the link definition file designates a moving image to which an area is mapped, and the displayed image processing unit displays the moving image when the link determination unit determines that the condition for switching is met.

26. The image processing device according to claim 25, further comprising: a decoding unit configured to start to decode, when the 2D image currently being displayed is mapped to the moving image, the moving image data independently of the determination by the link determination unit.

27. The image processing device according to claim 21, wherein the displayed image processing unit applies a visual effect, selected among the cross fade, dissolve, wipe, and page-flipping using polygon mesh, to a pre-switching 2D image and a post-switching 2D image, when switching the displayed image.

28. An image processing method adapted to display at least part of a two-dimensional (2D) image on a display, comprising:

reading a plurality of sets of 2D image data mapped to each other in a memory, as a processing target;

displaying at least a part of one of the plurality of 2D images;

acknowledging a user request to move a displayed part of the 2D image, the user request being a directive to move the displayed part of the 2D image to a user-defined portion of the 2D image via movement of the displayed part of the 2D image at least one of upward, downward, leftward, rightward, inward and outward irrespective of the user's physical, geographic position; and switching the display to a predetermined area of another 2D image, instead of the user-defined portion of the 2D image of the user request, when the user request indicates a change of the displayed part of the 2D image to the user-defined portion of the 2D image that meets a condition predefined in a memory, such that the displayed part of the 2D image is moved to the predetermined area of the another 2D image in the virtual space instead of the user-defined portion of the 2D image of the user request.

29. A non-transitory computer-readable recording medium having embodied thereon a computer program adapted to cause a computer to implement a function of displaying at least part of a two-dimensional (2D) image on a display, the computer program comprising:

a module configured to read a plurality of sets of 2D image data mapped to each other from a memory, as a processing target;

a module configured to display at least a part of one of the plurality of 2D images;

a module configured to acknowledge a user request to move a displayed part of the 2D image, the user request being a directive to move the displayed part of the 2D image to a user-defined portion of the 2D image via movement of the displayed part of the 2D image at least one of upward, downward, leftward, rightward, inward and outward irrespective of the user's physical, geographic position; and a module configured to switch the display to a predetermined area of another 2D image, instead of the user-defined portion of the 2D image of the user request, when the user request indicates a change of the displayed part of the 2D image to the user-defined portion of the 2D image that meets a condition predefined in a memory, such that the displayed part of the 2D image is moved to the predetermined area of the another 2D image in the virtual space instead of the user-defined portion of the 2D image of the user request.

30. An information processing device comprising:

an input information acquisition unit configured to acknowledge a user input for selecting a plurality of two-dimensional (2D) images as elemental images; and a definition information registration unit configured to generate data for an index image comprising an array of the elemental images in a predetermined format;

wherein each of the plurality of 2D images presents a hierarchical data structure comprising 2D image data with different resolutions hierarchized in order of resolution, the definition information registration unit maps each area representing the elemental image in the index image to each of the hierarchical data of corresponding 2D image, generates a link definition file for switching from data of the index image to hierarchical data of one of the 2D images for use in rendering the displayed image, and outputs the generated link definition file to a memory, wherein:

when an input information acquisition unit acknowledges a user request for movement of a displayed part of one of the 2D images, the user request being a directive to move the displayed part of the 2D image to a user-defined portion of the 2D image via movement of the displayed part of the 2D image at least one of upward, downward, leftward, rightward, inward and outward irrespective of the user's physical, geographic position, and when a displayed image processing switches the displayed image to a mapped area of another 2D image, instead of the user-defined portion of the 2D image of the user request, the user request must indicate a change of the displayed part of the 2D image to the user-defined portion of the 2D image that is within a predetermined range from a designated area defined in the link definition file such that the displayed part of the 2D image is moved to the mapped area of the another 2D image in the virtual space instead of the user-defined portion of the 2D image of the user request.

31. The information processing device according to claim 30, wherein the definition information registration unit generates data of the index image as hierarchical data.

32. The information processing device according to claim 30, wherein the definition information registration unit generates data for the index image by embedding the elemental images with a predetermined resolution in a predetermined area in the hierarchical data of the index image generated in advance.

33. The information processing device according to claim 30, wherein the elemental image includes a moving image.

34. The information processing device according to claim 30, wherein the definition information registration unit further generates a scenario definition file referred to in order to switch the displayed image between a plurality of areas in the index image and the elemental images, by acknowledging a user input for selecting a plurality of areas defined in the index image and the elemental images, and identifying coordinates of the selected plurality of areas in each virtual space defined by each 2D image plane and an axis of resolution and recording the identified coordinates.

35. The information processing device according to claim 34, wherein the information processing device further generates a file including data for the index image and data for the elemental images, or information related to a storage area storing the image data, the file also including the link definition file and the scenario definition file.

36. The information processing device according to claim 35, wherein the file also includes attribute information for controlling the use of the hierarchical data.

37. The information processing device according to claim 35, wherein the index image is an initial display screen displayed when content comprising the file is used or processed in the image processing device.

38. An information processing method comprising:

acknowledging a user input for selecting a plurality of two-dimensional (2D) images as elemental images;

generating data for an index image comprising an array of the elemental images read from a storage device in a predetermined format, and outputting the generated data to a memory;

wherein each of the plurality of 2D images presents a hierarchical data structure comprising 2D image data with different resolutions hierarchized in order of resolution, and wherein the step of outputting maps each area representing the elemental image in the index image to each of the hierarchical data of corresponding 2D image, generates a link definition file for switching from data of the index image to hierarchical data of one of the 2D images for use in rendering the displayed image, and outputs the generated link definition file, wherein:

when an input information acquisition unit acknowledges a user request for movement of a displayed part of one of the 2D images, the user request being a directive to move the displayed part of the 2D image to a user-defined portion of the 2D image via movement of the displayed part of the 2D image at least one of upward, downward, leftward, rightward, inward and outward irrespective of the user's physical, geographic position, and when a displayed image processing unit switches the displayed image to a mapped area of another 2D image, instead of the user-defined portion of the 2D image of the user request, the user request must indicate a change of the displayed part of the 2D image to the user-defined portion of the 2D image that is within a predetermined range from a designated area defined in the link definition file such that the displayed part of the 2D image is moved to the mapped area of the another 2D image in the virtual space instead of the user-defined portion of the 2D image of the user request.

39. A non-transitory computer-readable recording medium having embodied thereon a computer program, the computer program comprising:
- a module configured to acknowledge a user input for selecting a plurality of two-dimensional (2D) images as elemental images; and
- a module configured to generate data for an index image comprising an array of the elemental images read from a storage device in a predetermined format, and output the generated data to a memory;
- wherein each of the plurality of 2D images presents a hierarchical data structure comprising 2D image data with different resolutions hierarchized in order of resolution, and
- wherein the step of outputting maps each area representing the elemental image in the index image to each of the hierarchical data of corresponding 2D image, generates a link definition file for switching from data of the index image to hierarchical data of one of the 2D images for use in rendering the displayed image, and outputs the generated link definition file, wherein:
- when an input information acquisition unit acknowledges a user request for movement of a displayed part of one of the 2D images, the user request being a directive to move the displayed part of the 2D image to a user-defined portion of the 2D image via movement of the displayed part of the 2D image at least one of upward, downward, leftward, rightward, inward and outward irrespective of the user's physical, geographic position, and
- when a displayed image processing unit switches the displayed image to a mapped area of another 2D image, instead of the user-defined portion of the 2D image of the user request, the user request must indicate a change of the displayed part of the 2D image to the user-defined portion of the 2D image that is within a predetermined range from a designated area defined in the link definition file such that the displayed part of the 2D image is moved to the mapped area of the another 2D image in the virtual space instead of the user-defined portion of the 2D image of the user request.

40. A non-transitory computer-readable recording medium having recorded thereon a data structure for content adapted to map the following to each other:
- data for a plurality of two-dimensional (2D) images each of which has a hierarchical data structure configured by hierarchizing 2D image data with different resolutions in order of resolution;
- data for an index image comprising an array of the 2D images as elemental images arranged in a predetermined format; and
- a link definition file configured to map each area representing the elemental image in the index image to each of the hierarchical data of corresponding 2D image, and to switch from data of the index image to hierarchical data of one of the 2D images for use in rendering the displayed image, wherein:
- when an input information acquisition unit acknowledges a user request for movement of a displayed part of one of the 2D images, the user request being a directive to move the displayed part of the 2D image to a user-defined portion of the 2D image via movement of the displayed part of the 2D image at least one of upward, downward, leftward, rightward, inward and outward irrespective of the user's physical, geographic position, and
- when a displayed image processing unit switches the displayed image to a mapped area of another 2D image, instead of the user-defined portion of the 2D image of the user request, the user request must indicate a change of the displayed part of the 2D image to the user-defined portion of the 2D image that is within a predetermined range from a designated area defined in the link definition file such that the displayed part of the 2D image is moved to the mapped area of the another 2D image in the virtual space instead of the user-defined portion of the 2D image of the user request.

\* \* \* \* \*